(12) United States Patent
Imura et al.

(10) Patent No.: US 8,310,186 B2
(45) Date of Patent: Nov. 13, 2012

(54) APPARATUS FOR CARRYING OUT IMPROVED CONTROL OF ROTARY MACHINE

(75) Inventors: Akihiro Imura, Chita-gun (JP); Tomoya Takahashi, Anjo (JP)

(73) Assignee: Denso Corporation, Kariya (JP)

( * ) Notice: Subject to any disclaimer, the term of this patent is extended or adjusted under 35 U.S.C. 154(b) by 290 days.

(21) Appl. No.: 12/861,436

(22) Filed: Aug. 23, 2010

(65) Prior Publication Data

US 2011/0050137 A1    Mar. 3, 2011

(30) Foreign Application Priority Data

Aug. 25, 2009   (JP) ................................. 2009-193937

(51) Int. Cl.
*H02K 21/00*   (2006.01)
(52) U.S. Cl. ......... 318/400.15; 318/400.01; 318/400.02; 318/400.09; 318/700
(58) Field of Classification Search ............. 318/400.15, 318/400.01, 400.02, 400.09, 700
See application file for complete search history.

(56) References Cited

U.S. PATENT DOCUMENTS

| | | | |
|---|---|---|---|
| 5,942,876 A | 8/1999 | Maekawa | |
| 6,169,677 B1 | 1/2001 | Kitahata et al. | |
| 7,221,122 B2 * | 5/2007 | Yamada | 318/807 |
| 2006/0125435 A1 | 6/2006 | Geyer et al. | |
| 2006/0214623 A1 | 9/2006 | Yamada | |

FOREIGN PATENT DOCUMENTS

| | | |
|---|---|---|
| JP | A-2000-125570 | 4/2000 |
| JP | B2-3267524 | 1/2002 |
| JP | B2-3494928 | 11/2003 |
| JP | A-2006-174697 | 6/2006 |
| JP | A-2006-175697 | 7/2006 |
| JP | A-2006-280055 | 10/2006 |
| JP | B2-4149709 | 7/2008 |
| JP | A-2008-228419 | 9/2008 |

OTHER PUBLICATIONS

Japanese Office Action issued in Japanese Patent Application No. 2009-193937 dated Aug. 30, 2011 (with translation).

* cited by examiner

*Primary Examiner* — Bentsu Ro
*Assistant Examiner* — David Luo
(74) *Attorney, Agent, or Firm* — Oliff & Berridge, PLC

(57) ABSTRACT

In an apparatus, a predicting unit predicts, based on a target value of a drive mode of a power converter at a next timing, a first value of a controlled variable. The drive mode is indicative of a switching-state of each of a plurality of switching elements. The target value of the drive mode of the power converter at the next timing is temporarily set at a present timing prior to the next timing. A driving unit drives the plurality of switching elements based on the target value of the drive mode at the next timing while limiting a number of switching-state changes in the plurality of switching elements from the present timing to the next timing as long as the deviation between the predicted first value of the controlled variable at the further next timing and a command value therefor is within a threshold range.

15 Claims, 10 Drawing Sheets

| VOLTAGE VECTOR | SWITCHING ELEMENT IN ON STATE | | |
|---|---|---|---|
| | U-PHASE | V-PHASE | W-PHASE |
| V0 | L | L | L |
| V1 | H | L | L |
| V2 | H | H | L |
| V3 | L | H | L |
| V4 | L | H | H |
| V5 | L | L | H |
| V6 | H | L | H |
| V7 | H | H | H |

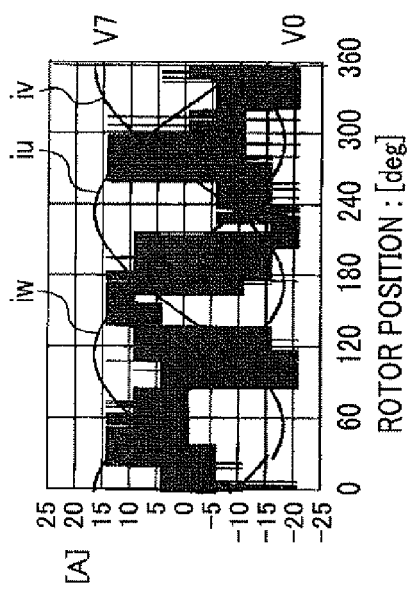
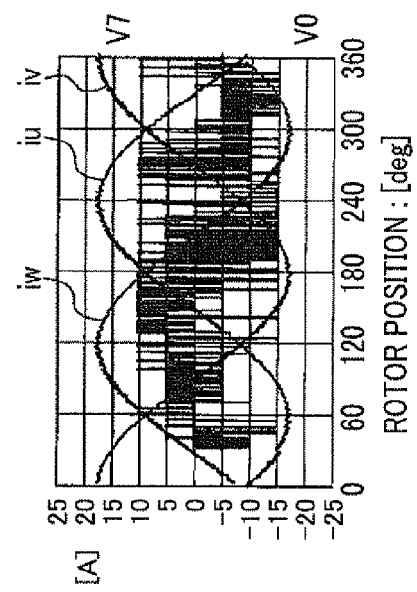
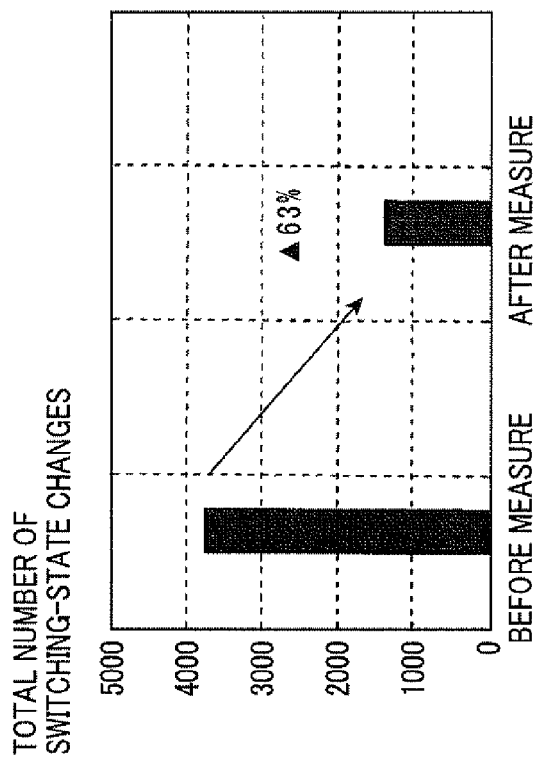

APPARATUS FOR CARRYING OUT IMPROVED CONTROL OF ROTARY MACHINE

CROSS REFERENCE TO RELATED APPLICATIONS

This application is based on Japanese Patent Application 2009-193937 filed on Aug. 25, 2009. This application claims the benefit of priority from the Japanese Patent Application, so that the descriptions of which are all incorporated herein by reference.

FIELD OF THE INVENTION

The present invention relates to apparatuses for driving a plurality of switching elements of a power converter so that each of the switching elements selectively establishes electrical connection and electrical disconnection between a terminal of a rotary machine and a voltage application unit for applying a plurality of different voltage levels to the terminal of the rotary machine through the power converter. The drive of the power converter controls a controlled variable of the rotary machine.

BACKGROUND OF THE INVENTION

A type of such control apparatuses set forth above, for example, disclosed in U.S. Pat. No. 7,256,561 corresponding to Japanese Patent Application Publication No. 2006-174697, is designed to carry out a method of driving a converter circuit for a rotating electrical machine under model predictive control.

Specifically, the control apparatus disclosed in the US Patent Publication temporarily determines switching state sequences for each of switching state combinations at each of N sampling times from a start sampling time k; these N sampling times are expressed as k, k+1, k+2, . . . , k+N−1 (N≧1). Then, for each of the switching state sequences, the control apparatus calculates a torque trajectory of the rotating electrical machine from the starting sampling time k up to the sampling time k+N.

Next, the control apparatus predicts, by extrapolation, a following torque trajectory based on the torque trajectory from the sampling time k+N−1 to k+N of each of switching state sequences.

For each of the switching state sequences, the control apparatus determines the number of times n until the extrapolation values of the predicted following torque trajectory is outside a preset range.

Next, for each of the switching state sequences, the control apparatus divides, by the number of times n, a number of switching transitions defined by a corresponding one of the switching state sequences.

Then, the control apparatus determines, as an actual switching state at the sampling time k, the switching state at the sampling time k with which the corresponding switching state sequence has the smallest divided value.

This control apparatus set forth above may reduce the number of switching transitions of the converter circuit.

SUMMARY OF THE INVENTION

The inventors have discovered that there are problems in the control apparatus disclosed in the U.S. Pat. No. 7,256,561.

Specifically, the longer the period until which the extrapolation values of the predicted following torque trajectory are outside the preset range is, the smaller the divided value is. For this reason, the divided value even for switching state sequences each with a large number of switching traditions becomes small when the extrapolation values of the predicted following torque trajectory of these switching state sequences are large.

Thus, the control apparatus disclosed in the U.S. Pat. No. 7,256,561 may not necessarily reduce the number of switching transitions of the converter circuit.

Particularly, the predictability of the following torque trajectory by extrapolation is not quite high. Thus, the control apparatus disclosed in the U.S. Pat. No. 7,256,561 changes, for each of the switching state sequences, corresponding weighting of the number of switching transitions based on the corresponding predicted following torque trajectory with a low predictability. This may reduce, in reliability, the process of reducing the number of switching transitions of the converter circuit.

In view of the circumstances set forth above, the present invention seeks to provide apparatuses for carrying out model predictive control of a rotary machine; these apparatuses are designed to address the problems in the control apparatus disclosed in the U.S. Pat. No. 7,256,561.

Specifically, the present invention aims at reducing the number of switching traditions (switching-state changes) in a plurality of switching elements of a power converter without reducing the reliability of its process.

According to one aspect of the present invention, there is provided an apparatus for driving a plurality of switching elements of a power converter so that each of the plurality of switching elements selectively establishes electrical connection and electrical disconnection between a terminal of a rotary machine and a voltage application unit for applying a plurality of different voltage levels to the terminal of the rotary machine through the power converter to thereby control a controlled variable of the rotary machine. The apparatus includes a predicting unit configured to predict, based on a target value of a drive mode of the power converter at a next timing, a first value of the controlled variable. The drive mode is indicative of a switching-state of each of the plurality of switching elements. The target value of the drive mode of the power converter at the next timing is temporarily set at a present timing prior to the next timing. The apparatus includes a driving unit configured to drive the plurality of switching elements of the power converter based on the target value of the drive mode of the power converter at the next timing while limiting a number of switching-state changes in the plurality of switching elements from the present timing to the next timing as long as the deviation between the predicted first value of the controlled variable and a command value therefor is within a threshold range.

With the one aspect of the present invention, the number of switching-state changes in the plurality of switching elements is limited from the present timing to the next timing as long as the deviation between the predicted first value of the controlled variable and the command value therefor is within the threshold range.

This makes it possible to effectively reduce the number of switching-state changes in the plurality of switching elements while maintaining the controllability of the controlled variable at a high level enough to prevent the deviation between the predicted first value of the controlled variable and the command value therefor from being out of the threshold range.

According to another aspect of the present invention, there is provided an apparatus for driving a plurality of switching elements of a power converter so that each of the plurality of switching elements selectively establishes electrical connection and electrical disconnection between a terminal of a rotary machine and a voltage application unit for applying a plurality of different voltage levels to the tei of the rotary machine through the power converter to thereby control a controlled variable of the rotary machine. The apparatus includes a first predicting unit configured to predict, based on a target value of a drive mode of the power converter at a next timing, a first value of the controlled variable. The drive mode is indicative of a switching-state of each of the plurality of switching elements. The target value of the drive mode of the power converter at the next timing is temporarily set to be equal to a present value of the drive mode determined at a present timing prior to the next timing. The apparatus includes a determining unit configured to determine whether to use the target value of the drive mode of the power converter to thereby drive the plurality of switching elements of the power converter based on whether the deviation between the predicted first value of the controlled variable and a command value therefor is within a threshold range.

With another aspect of the present invention, the first value of the controlled variable is predicted by the first predicting unit based on the target value of the drive mode of the power converter at the next timing. The target value of the drive mode of the power converter at the next timing is temporarily set to be equal to the present value determined at the present timing prior to the next timing.

Thereafter, whether to use the target value of the drive mode of the power converter to thereby drive the plurality of switching elements of the power converter is determined based on whether the deviation between the predicted first value of the controlled variable and the command value therefor is within the threshold range.

That is, if the deviation was within the threshold range, using the target value of the drive mode at the next timing, which is unchanged from the present value thereof at the present timing, to thereby drive the plurality of switching elements of the power converter would have little effect on the controllability of the controlled variable. Thus, it is possible to reduce the number of switching-state changes in the plurality of switching elements while having little effect on the controllability of the controlled variable.

BRIEF DESCRIPTION OF THE DRAWINGS

Other objects and aspects of the invention will become apparent from the following description of embodiments with reference to the accompanying drawings in which:

FIG. 6A is a graph schematically illustrating a further benefit achieved by the control system illustrated in FIG. 1;

FIG. 6B is a graph schematically illustrating a plot of the change in selected voltage vector versus the rotational position (angle) of a rotor in degrees relative to a predetermined reference position when the three-phase inverter is driven under the model predictive control illustrated in the flowchart in FIG. 3 without executing steps S14 to S18;

FIG. 6C schematically illustrates a plot of the change in selected voltage vector versus the rotational position of the rotor in degrees relative to the predetermined reference position when the three-phase inverter is driven under the model predictive control illustrated in the flowchart in FIG. 3;

DETAILED DESCRIPTION OF EMBODIMENTS
OF THE INVENTION

Embodiments of the present invention will be described hereinafter with reference to the accompanying drawings. In each of the embodiments, the present invention is, for example, applied to a control system for a three-phase motor-generator installed in a hybrid vehicle; this three-phase motor-generator is an example of various types of multiphase rotary machines.

First Embodiment

Figure 1:
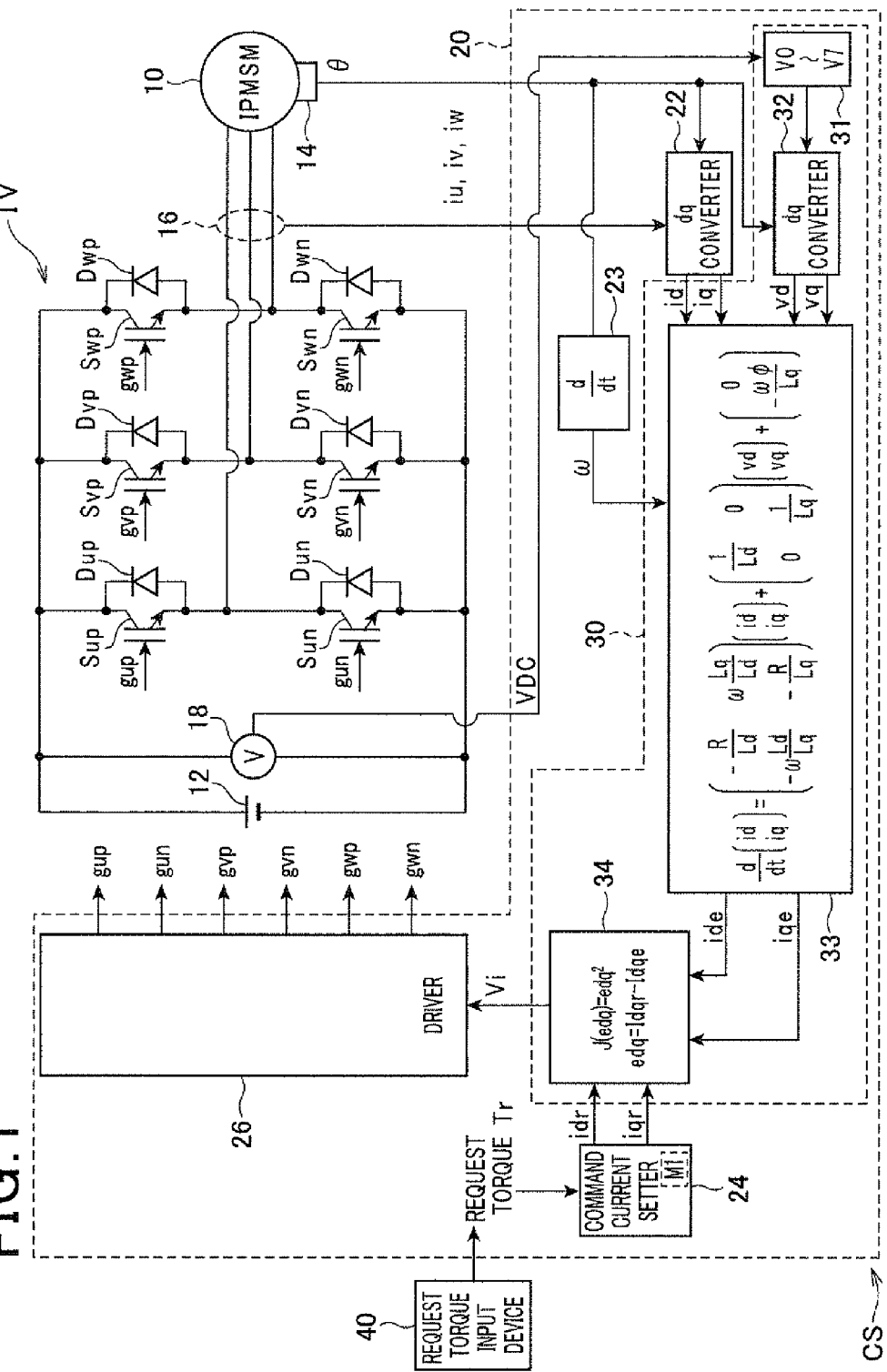
FIG. 1 is a circuit and block diagram of a control system comprised of a three-phase motor-generator, a three-phase inverter, and a controller according to the first embodiment of the present invention.

Referring to the drawings, particularly to FIG. 1, there is illustrated a three-phase motor-generator, referred to simply as "motor-generator" 10, installed in, for example, a hybrid vehicle. In the first embodiment, as the motor-generator 10, an IPMSM (Interior Permanent Magnet Synchronous Motor) having a salient-pole structure is used.

In FIG. 1, there is also illustrated an inverter IV serving as a power converter, a high-voltage battery 12, a rotational angle sensor 14, current sensors 16, a voltage sensor 18, an interface (not shown), and a controller 20. The inverter IV, the battery 12, the rotational angle sensor 14, the current sensors 16, the voltage sensor 18, the interface (not shown), and the controller 20 provide a control system CS for the motor-generator 10.

Specifically, the motor-generator 10 and the high-voltage battery 12 can establish electrical connection therebetween via the inverter IV.

For example, the motor-generator 10 is provided with an annular rotor having an iron rotor core. The iron rotor core is, for example, directly or indirectly coupled to a crankshaft of an engine installed in the hybrid vehicle.

The rotor has a salient-pole structure.

Specifically, the rotor core of the rotor is provided at its circumferential portions with at lest one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian electric angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

Specifically, in an SPM (Surface Permanent Magnet) rotor or an IPM (Interior Permanent Magnet) rotor, d-axis is defined as the direction toward the center of the same polarity (N) pole thereof, and q-axis is defined as an axis electromagnetically orthogonal to the d-axis.

In a magnet-less motor, q-axis is defined as a minimal magnetic reluctance thereof, and d-axis is defined as an axis electromagnetically orthogonal to the q-axis.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings) wound in the slots of the stator.

The three-phase (U-, V-, and W-phase) windings are wound in the slots such that the U-, V-, and W-phase windings are shifted by an electric angle of, for example, $2\pi/3$ radian in phase from each other.

One ends of the U-, V-, and W-phase windings are connected to each other in, for example, star configuration.

The motor-generator 10 is operative to receive at its three-phase windings three-phase currents to thereby generate a rotating magnetic flux; this allows the rotor to turn based on magnetic attractive force between the rotating magnetic flux and a magnetic flux of the rotor.

The inverter IV is designed as a three-phase inverter. The inverter IV is comprised of a first pair of series-connected high- and low-side switching elements Sup and Sun, a second pair of series-connected high- and low-side switching elements Svp and Svn, and a third pair of series-connected high- and low-side switching elements Swp and Swn. The inverter IV is also comprised of flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The cathode of each of the flywheel diodes Dup, Dun, Dvp, Dvn, Dwp, and Dwn is connected with the drain of a corresponding one of the switching elements Sup, Sun, Svp, Svn, Swp, and Swn, and the anode thereof is connected with the source of a corresponding one of the switching elements Sup, Sun, Svp, Svn, Swp, and Swn.

The first, second, and third pairs of switching elements Sup, Sun, Svp, Svn, Swp, and Swn are parallely connected with each other in bridge configuration.

Ends of the high-side switching elements (upper arms) Sup, Svp, and Swp are collected as a common connection terminal (DC input terminal), and the common connection terminal is connected with the positive electrode of the high-voltage battery 12. Ends of the low-side switching elements (lower arms) Sun, Svn, and Swn are collected as a common connection terminal (DC input terminal), and the common connection terminal is connected with the negative electrode of the high-voltage battery 12.

The angular sensor 14 is arranged, for example, close to the rotor of the motor-generator 10 and operative to measure an actual rotational angle (electric angle) θ of the d-axis of the rotor with respect to a stator coordinate system fixed in space which characterizes the three-phase windings of the stator. The angular sensor 14 is communicable with the controller 20 via the interface and operative to send, to the controller 20 via the interface, the measured actual rotation angle θ of the rotor.

The current sensors 16 are communicable with the controller 20 via the interface and operative to measure three-phase instantaneous current values iu, iv, and iw to flow through the respective U-, V-, and W-phase windings of the motor-generator 10. The current sensors 16 are operative to output, to the controller 20 through the interface, the measured instantaneous values of the three-phase instantaneous current values iu, iv, and iw.

The voltage sensor 18 is communicable with the controller 20 via the interface and operative to output, to the controller 20, a signal indicative of an input voltage (battery voltage VDC) across the high-voltage battery 12.

The controller 20 is designed as, for example, a computer circuit consisting essentially of, for example, a CPU, an I/O interface, and a memory unit, and operates on a voltage lower than the battery voltage VDC. Thus, the controller 20 constitutes a low voltage system, and the motor-generator 10, the inverter IV, and the high-voltage battery 12 constitute a high voltage system.

The interface is provided with, for example, photo-couplers as examples of insulators. The interface is configured to establish electrical insulation between the low voltage system (the controller 20) and the high voltage system, and to allow communications therebetween.

The controller 20 is communicable with a request torque input device 40 installed in the hybrid vehicle. The request torque input device 40 is operative to input, to the controller 20, a commanded torque (request torque) of a user, such as an acceleration command of the user.

For example, an accelerator position sensor installed in the hybrid vehicle can be used as the request torque input device 40. Specifically, the accelerator position sensor is operative to sense an actual position of an accelerator pedal of the hybrid vehicle operable by the driver and to send, as data representing a request torque of the driver, the sensed actual position of the accelerator pedal to the controller 20. The data representing a variable request torque will be referred to as "request torque data" hereinafter.

According to the pieces of data sent from the sensors 14, 16, and 18, the controller 20 is operative to generate:

a drive signal gup for driving the switching element Sup;
a drive signal gun for driving the switching element Sun;
a drive signal gvp for driving the switching element Svp;
a drive signal gvn for driving the switching element Svn;
a drive signal gwp for driving the switching element Swp; and
a drive signal gwn for driving the switching element Swn.

Each of the drive signals gup, gun, gvp, gvn, gwp, and gwn is, for example, a pulse signal with a controllable duty cycle (controllable pulse width, or controllable on duration).

Specifically, the controller 20 is operative to drive the inverter IV by individually adjusting the duty cycle of each of the drive signals gup, gun, gvp, gvn, gwp, and gwn to thereby regulate a torque (output torque) T to be generated in the motor-generator 10 to a commanded torque (request torque) Tr. In other words, the controller 20 is operative to individually adjust the duty cycle of each of the drive signals gup, gun, gvp, gvn, gwp, and gwn to thereby regulate drive current flowing into the motor-generator 10 to command current required for the motor-generator 10 to generate the request torque Tr.

That is, although the torque T to be generated in the motor-generator 10 is a target controlled variable of the motor-generator 10, the controller 20 actually controls, as a direct controlled variable, the drive current flowing into the motor-generator 10 to the command current required for the motor-generator 10 to generate the request torque Tr.

Particularly, the controller 20 according to the first embodiment carries out model predictive control so as to regulate a value of the drive current flowing into the motor-generator 10 to a value of the command current. The model predictive control is designed to predict a value of the drive current flowing into the motor-generator 10 for each of a plurality of switching modes (drive modes) of the inverter IV, and select one of the plurality of switching modes. The selected one of the plurality of switching modes allows the predicted value of the drive current to be the closest to a corresponding value of the command current.

Referring to FIG. 1, the controller 20 includes functional modules equivalent to tasks to be executed by the controller 20 according to the first embodiment.

Specifically, the controller 20 includes a dq converter 22, a speed calculator 23, a command current setter 24, and a model predictive control unit 30. The model predictive control unit 30 includes a switching-mode setter 31, a dq converter 32, a predictor 33, and a switching mode determiner 34. Note that each of or some of the functional modules included in the controller 20 can be designed as a hardware circuit, a programmed logic circuit, or a hardware and programmed-logic hybrid circuit.

The dq converter 22 works to receive the three-phase instantaneous current values iu, iv, and iw measured by the current sensor 16 and the actual rotation angle θ measured by the angular sensor 14.

The dq converter 22 also works to convert the received three-phase instantaneous current values iu, iv, and iw in the stator coordinate system into actual d-axis and q-axis currents id and iq in the d-q coordinate system of the rotor based on the received actual rotational angle θ.

The speed calculator 23 works to receive the actual rotation angle θ measured by the angular sensor 14, and calculate, based on the actual rotation angle θ, an actual electric angular velocity (rotational velocity) ω of the d-axis of the rotor.

The command current setter 24 works to receive the request torque Tr inputted from the request torque input device 40. The command current setter 24 works to set a d-axis command current idr and a q-axis command current iqr in the d-q coordinate system of the rotor based on the received request torque Tr. The d-axis command current idr and the q-axis command current iqr correspond to request three-phase currents in the d-q coordinate system; these request currents are required to generate the request torque Tr.

For example, the command current setter 24 stores therein a map M1 comprised of, for example, a data table, an equation, or a program. The map M1 represents a function (relationship) between a variable of the request torque Tr and a variable of each of the command currents idr and iqr. Based on the map M1, the command current setter 24 sets the command currents idr and iqr corresponding to the input value of the request torque Tr.

These command currents idr and iqr, the actual currents id and iq, and the rotational velocity ω are passed to the model predictive control unit 30 as input parameters. Based on the input parameters, the model predictive control unit 30 works to determine one of voltage vectors Vi that defines one of the plurality of switching modes in which the inverter IV is driven. The model predictive control unit 30 also works to input the determined one of the voltage vectors Vi to the driver 26. The driver 26 works to generate, based on the inputted voltage vector Vi, the drive signals gup, gun, gvp, gvn, gwp, and gwn each with an adjusted value of the duty cycle, and output, to the respective switching elements Sup, Sun, Svp, Svn, Swp, and Swn, the generated drive signals gup, gun, gvp, gvn, gwp, and gwn.

Figures 2A, 2B:
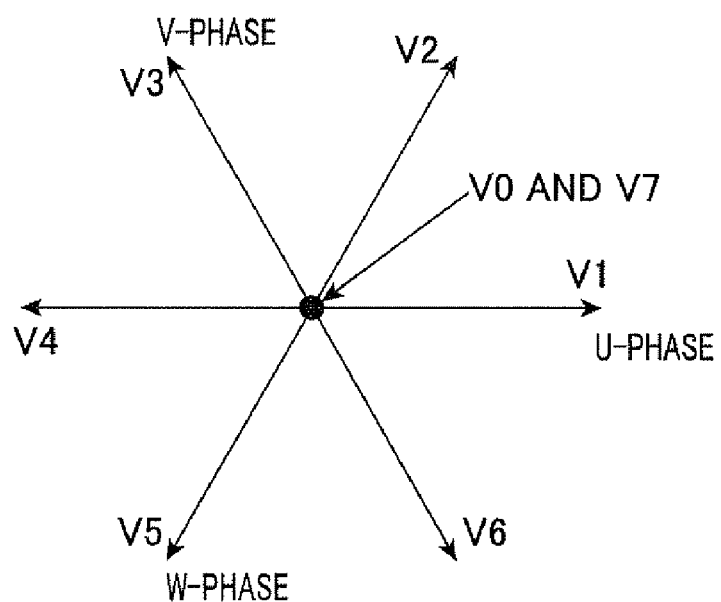
FIG. 2A is a table schematically illustrating the on or off state of high- and low-side switching elements of each phase in the three-phase inverter for each of voltage vectors that define drive modes of the three-phase inverter according to the first embodiment.
FIG. 2B is a view schematically illustrating the voltage vectors in a three-phase stationary coordinate space defined in a stator of the motor-generator according to the first embodiment.

The voltage vectors Vi defining on-off modes of the respective switching elements Sup, Sun, Svp, Svn, Swp, and Swn of the inverter IV are expressed by eight space voltage vectors V0 to V7 illustrated in FIGS. 2A and 2B.

In FIG. 2A, reference character "H" represents that the high-side switching element of a corresponding pair of the switching elements is ON, and reference character "L" represents that the low-side switching element of a corresponding pair of the switching elements is ON.

For example, the voltage vector V0 (L, L, L) expresses a switching mode in which all of the low-side switching elements Sun, Svn, and Swn are ON and all of the high-side switching elements Sup, Svp, and Swp are OFF. In addition, the voltage vector V7 (H, H, H) expresses a switching mode in which all of the high-side switching elements Sup, Svp, and Swp are ON and all of the low-side switching elements Sun, Svn, and Swn are OFF. The voltage vector V1 (H, L, L) expresses a switching mode in which the high-side switching element Sup and the low-side switching elements Svn and Swn are ON, and the low-side switching element Sun and the high-side switching elements Svp and Swp are OFF.

The voltage vectors V0 and V7 express that all of the three-phase windings are short-circuited so that line-to-line voltages between the three-phase windings of the motor-generator 10 are all zero. Thus, the voltage vectors V0 and V7 will be referred to as "zero vectors" hereinafter.

In contrast, each of the remaining voltage vectors V1 to V6 express a switching mode in which at least one of the high-side switching elements and at least one of the low-side switching elements are ON. Thus, the voltage vectors V1 to V6 will be referred to as "non-zero vectors" hereinafter. Note that, as illustrated in FIG. 2B, each of the voltage vectors V1, V3, and V5 corresponds to a corresponding one of positive U-, V-, and W-phase axes in the three-phase stationary coordinate space defined in the stator of the motor-generator 10.

Next, functions of the model predictive control unit 30 will be described hereinafter.

The switching-mode setter 31 is operative to set the switching mode of the inverter IV. In the first embodiment, the switching-mode setter 31 selects one of the voltage vectors V0 to V7, and sets the selected voltage vector Vi (i=0, 1, 2, 3, 4, 5, 6, or 7) as the switching mode of the inverter IV.

Note that, because the substantial half of the input DC voltage (the battery voltage VDC) to the inverter IV is applied to each phase winding, the reference character "H" represents VDC/2 to be applied to a corresponding phase winding, and the reference character "L" represents –VDC/2 to be applied to a corresponding phase winding. That is, the components of the selected voltage vector Vi can be represented by VDC/2 and –VDC/2.

For example, the voltage vector V0 is represented as V0 (–VDC/2, –VDC/2, –VDC/2), and the voltage vector V1 is represented as V1 (VDC/2, –VDC/2, –VDC/2).

The dq converter 32 is operative to convert the selected voltage vector Vi into a voltage vector (vd, vq) in the d-q coordinate system of the rotor based on the received actual rotational angle θ.

The predictor 33 is operative to predict, based on the voltage vector (vd, vq), the actual d- and q-axis currents id and iq, and the actual electric angular velocity ω, a d-axis current value id and a q-axis current value iq that should flow into the motor-generator 10 when the inverter IV is driven in the selected voltage vector Vi. Specifically, the predictor 33 cyclically predicts the d-axis current value id and q-axis current value iq based on the voltage vector (vd, vq), the actual d-axis and q-axis currents id and iq, and the actual electric angular velocity ω.

Note that, in the motor-generator 10 in the d-q coordinate system, the following normal voltage equations [c1] and [c2] based on fundamental-wave drive without considering the stator iron loss are established:

$$vd=(R+pLd)id-\omega Lqiq \quad [c1]$$

$$vq=\omega Ldid+(R+pLq)iq+\omega\phi \quad [c2]$$

where R represents a resistance of each armature winding, p represents a differential operator, Ld represents the inductance in the d-axis, Lq represents the inductance in the q-axis, and φ represents a flux linkage constant to the armature windings.

Solving the equations [c1] and [c2] for the deviation terms of the actual d- and q-axis currents id and iq establishes the following equations [c3] and [c4]:

$$pid=-(R+Ld)id+\omega(Lq/Ld)iq+vd/Ld \quad [c3]$$

$$piq=-\omega(Ld/Lq)id-(Rd/Lq)iq+vq/Lq-\omega\phi/Lq \quad [c4]$$

The equations [c3] and [c4] can be expressed as the following equation:

$$\frac{d}{dt}\begin{pmatrix} id \\ iq \end{pmatrix} = \begin{pmatrix} -\frac{R}{Ld} & \omega\frac{Lq}{Ld} \\ -\omega\frac{Ld}{Lq} & -\frac{R}{Lq} \end{pmatrix}\begin{pmatrix} id \\ iq \end{pmatrix} + \begin{pmatrix} \frac{1}{Ld} & 0 \\ 0 & \frac{1}{Ld} \end{pmatrix}\begin{pmatrix} vd \\ vq \end{pmatrix} + \begin{pmatrix} 0 \\ -\frac{\omega\phi}{Lq} \end{pmatrix}$$

At a present prediction cycle, the predictor 33 discretizes the equations [c3] and [c4] using, for example, a forward difference method, and predicts a value ide of the d-axis current id and a value iqe of the q-axis current iq at the next prediction cycle based on the discretized equations [c3] and [c4].

The predictor 33 carries out the prediction of a value of the d-axis current id and a value of the q-axis current iq for each of the voltage vectors V0 to V7. That is, a value ide of the d-axis current id and a value iqe of the q-axis current iq are predicted for each of the voltage vectors V0 to V7.

The switching mode determiner 34 is operative to determine one of the eight switching modes corresponding to the voltage vectors V0 to V7 based on the predicted current values ide and iqe of the d- and q-axis currents id and iq for each of the voltage vectors V0 to V7 and the d- and q-axis command currents idr and iqr.

In the first embodiment, the switching mode determiner 34 evaluates values of an evaluation function J of the respective eight switching modes, and selects one of the eight switching modes, the evaluation of which is the highest in all of the eight switching modes.

In the first embodiment, the evaluation function J has a characteristic that a value of the evaluation function J increases with decrease in evaluation. Specifically, a value of the evaluation function J of one switching mode is calculated based on the inner product edq$^2$ of the deviation edq of a command current vector Idqr (idr, iqr) in the d-q coordinate system from a predicted current vector Idqe (ide, iqe) in the d-q coordinate system. The deviation edq of each of the d- and q-axis command currents (idr, iqr) of the command current vector Idqr from a corresponding one of the predicted d- and q-axis current values (ide, iqe) of the predicted current vector Idqe can take a positive or a negative value. For this reason, the evaluation function J expressed as the inner product edq$^2$ can have a characteristic that a value of the evaluation function J increases with decrease in evaluation.

Note that the switching-mode determining method set forth above may not necessarily reduce the number of switching-state changes (ON or OFF) in the plurality of switching elements of the inverter IV from a present switching mode to a next switching mode.

Thus, the control system CS according to the first embodiment is directed to reduce the number of switching-state changes in the plurality of switching elements of the inverter IV from a present switching mode to a next switching mode.

For example, when the switching mode of the inverter IV is changed from the voltage vector V1 (H, L, L) to the voltage vector V5 (L, L, H), the number of switching-state changes in the plurality of switching elements of the inverter IV is 2. In addition, when the switching mode of the inverter IV is changed from the voltage vector V0 (L, L, L) to the voltage vector V7 (H, H, H), the number of switching-state changes in the plurality of switching elements of the inverter IV is 3.

Specifically, the switching mode determiner 34 is operative to determine the previous switching mode determined at the previous prediction cycle as a present switching mode at a present prediction cycle when the deviation edq of the command current vector Idqr from the predicted current vector Idqe at the present prediction cycle is equal to or less than a predetermined threshold.

Next, a routine of the model predictive control to be executed by the controller 20 will be described hereinafter with reference to FIG. 3; this routine is equivalent to the functional modules 22 to 24, 26, and 31 to 34. The routine is repeatedly executed by the controller 20 at the preset prediction cycle referred to as "Tc".

When the routine is launched at a present prediction cycle Tc(n), the controller 20 receives the actual rotational angle θ(n) from the angular sensor 14, and obtains the actual d-axis and q-axis currents id(n) and iq(n) in step S10. Note that reference character (n) represents that a parameter value X to which the reference character (n) is assigned as X(n) is obtained by the controller 20 at the present prediction cycle Tc(n). Thus, a parameter value X obtained at the previous prediction cycle Tc(n−1) is expressed as X(n−1).

In step S10, the controller 20 also outputs, to the driver 26, a voltage vector V(n) determined at the previous prediction cycle Tc (n−1) for the present prediction cycle Tc (n).

Next, in step S12, the controller 20 predicts, based on the voltage vector V(n), a d-axis current value ide(n+1) and a q-axis current value iqe(n+1) at the next prediction cycle Tc(n+1). In the first embodiment, as described above, the controller 20 discretizes an equation model of the motor-generator 10 in the d-q coordinate system expressed by the equations [c3] and [c4] by the prediction control cycle Tc in accordance with the forward difference method. Then, the controller 20 calculates the d-axis current value ide(n+1) and q-axis current value iqe(n+1) at the next prediction cycle Tc(n+1) based on the discretized equation model.

In step S12, the controller 20 uses the actual d-axis and q-axis currents id(n) and iq(n) obtained in step S10 as initial values of the d- and q-axis currents id and iq in the equations [c3] and [c4]. In addition, in step S12, the controller 20 converts, using the actual rotational angle θ(n), the voltage vector V(n) into a voltage vector Vdq(n) in the d-q coordinate system, and uses the d- and q-axis components of the voltage vector Vdq(n) as the d- and q-axis voltages vd and vq in the equations [c3] and [c4].

For example, assuming that $\begin{pmatrix} -\frac{R}{Ld} & \omega\frac{Lq}{Ld} \\ -\omega\frac{Ld}{Lq} & -\frac{R}{Lq} \end{pmatrix}$, $\begin{pmatrix} \frac{1}{Ld} & 0 \\ 0 & \frac{1}{Lq} \end{pmatrix}$, and $\begin{pmatrix} 0 \\ -\frac{\omega\varphi}{Lq} \end{pmatrix}$ are respectively expressed as A, B, and F, the discretized equation model of the predicted current vector Idqe(n) can be expressed by the following equation:

$$Idqe(n+1)=Ad \cdot Idq(n)+Bd \cdot Vdq(n)+Fd$$

where Ad is $e^{ATc}$, $$Bd \text{ is } \int_0^{Tc} e^{A\tau} d\tau B, Fd \text{ is } \int_0^{Tc} e^{A\tau} d\tau F,$$

and idq(n) represents a vector of the actual d-axis and q-axis currents id(n) and iq(n).

The voltage vector Vdq(n) can be expressed by the following equation:

$$Vdq(n)=C(\theta(n)) \cdot V(n)$$

where C is a constant.

Next, the controller 20 carries out operations in steps S14 to S16. These operations predict d- and q-axis current values ide(n+2) iqe(n+2) at the prediction cycle Tc(n+2) after the next prediction cycle Tc(n+1) when the voltage vector V(n+1) at the next prediction cycle Tc(n+1) is set to the voltage vector V(n) at the present prediction cycle Tc(n).

Specifically, the controller 20 sets the voltage vector V(n) at the present prediction cycle Tc(n) as the voltage vector V(n+1) at the next prediction cycle Tc(n+1) in step S14.

In step S16, the controller 20 calculates, based on the voltage vector V(n+1) equal to the voltage vector V(n), the d-axis current value ide(n+2) and q-axis current value iqe(n+2) at the prediction cycle Tc(n+2) in accordance with the discretized equation model in the same manner as step S12.

Note that, in step S16, the controller 20 uses the predicted d-axis and q-axis current values ide(n+1) and iqe(n+1) calculated in step S12 as initial values of the d- and q-axis currents id and iq in the equations [c3] and [c4]. In addition, in step S16, the controller 20 converts, using the sum of the actual rotational angle θ(n) and the product "ωTc" of the ω and the prediction cycle Tc, the voltage vector V(n+1) into a voltage vector Vdq(n+1) in the d-q coordinate system.

For example, the discretized equation model of the predicted current vector Idqe(n+2) can be expressed by the following equation:

$$Idqe(n+2)=Ad \cdot Idq(n+1)+Bd \cdot Vdq(n+1)+Fd$$

The voltage vector Vdq(n+1) can be expressed by the following equation:

$$Vdq(n+1)=C(\theta(n)+\omega Tc) \cdot V(n+1)$$

In step S18, the controller 20 calculates the norm ($\sqrt{edq(n+2)^2}$) of the deviation edq of the command current vector Idqr (idr, iqr) from the predicted current vector Idqe (n+2) (ide(n+1), iqe(n+1)). Then, the controller 20 determines whether the norm $\sqrt{edq(n+2)^2}$ is equal to or less than a switching-limitation priority threshold eth in step S18. This operation is to determine whether to use the voltage vector V(n) at the present prediction cycle Tc(n) as the voltage vector V(n+1) at the next prediction cycle Tc(n+1).

In step S18, for example, the controller 20 variably sets the switching-limitation priority threshold eth as a function of the request torque Tr and the rotational velocity ω.

Note that the torque to be generated in the motor-generator 10 is a parameter associated with the magnitude of a current flowing in the motor-generator 10. This contributes to the fact that the ratio (accuracy), to the output torque, of the deviation of the output torque from the request torque is changed depending on the change in the magnitude of the current even with the same value of the switching-limitation priority threshold eth.

For this reason, the switching-limitation priority threshold eth can be set based on the request torque Tr according to how identifiable the ratio (accuracy) is required independently of the operating conditions of the motor-generator 10.

The switching-limitation priority threshold eth can be set based on the magnitude of a current flowing in the motor-generator 10 because the magnitude of the current correlates with the switching loss of the inverter IV.

In addition, the rotational velocity ω is a parameter associated with the iron loss of the motor-generator 10. Specifically, the more the rotational velocity ω increases, the more the iron loss of the motor-generator 10 increases.

For this reason, the switching-limitation priority threshold eth can be set based on the rotational velocity ω according to how much the increase in the iron loss of the motor-generator 10 is reduced.

Upon determining that the norm $\sqrt{edq(n+2)^2}$ is greater than the switching-limitation priority threshold eth (NO in step S18), the controller 20 determines that using the voltage vector V(n) at the present prediction cycle Tc(n) as the voltage vector V(n+1) at the next prediction cycle Tc(n+1) is improper. This is because matching the output torque to be generated in the motor-generator 10 with the request torque Tr is given priority over limiting the shift from the voltage-vector V(n) to the voltage vector V(n+1).

Then, the controller 20 calculates the d-axis current value ide(n+2) and q-axis current value iqe(n+2) at the prediction cycle Tc(n+2) based on the discretized equation model in the same manner as step S16 when temporarily setting the voltage vector V(n+1) at the next prediction cycle Tc(n+1) to each of the voltage vectors V0 to V7 except for the voltage vector V(n) at the present prediction cycle Tc(n) in step S20.

In step S22, the controller 20 carries out an operation to determine the voltage vector V(n+1) at the next prediction cycle Tc(n+1). Specifically, in step S22, the controller 20 determines, as the target voltage vector V(n+1) at the next prediction cycle Tc(n+1), one of the voltage vectors V0 to V7 except for the voltage vector V(n); this one of the voltage vectors V0 to V7 except for the voltage vector V(n) minimizes the evaluation function J in all of the voltage vectors V0 to V7 except for the voltage vector V (n).

Specifically, the predicted d- and q-axis current values ide (n+2) and iqe (n+2) for each of the voltage vectors V0 to V7 except for the voltage vector V(n) have been calculated by the operation in step S20.

Thus, in step S22, the controller 20 calculates the deviation edq(n+2) of the command current vector Idqr(n+2) from the predicted current vector Idqe(n+2) for each of the voltage vectors V0 to V7 except for the voltage vector V(n). Then, in step S22, the controller 20 calculates, as the evaluation function J, the inner product $edq(n+2)^2$ of the deviation edq(n+2) of the command current vector Idqr(n+2) from the predicted current vector Idqe(n+2) for each of the voltage vectors V0 to V7 except for the voltage vector V(n).

In step S22, the controller 20 calculates the deviation edq (n+2) of the command current vector Idqr(n+2) from the predicted current vector Idqe(n+2) for the voltage vector V(n). Then, the controller 20 calculates, as the evaluation function J, the inner product $edq(n+2)^2$ of the deviation edq (n+2) of the command current vector Idqr(n+2) from the predicted current vector Idqe(n+2) for the voltage vector V(n) in step S22.

That is, eight values of the evaluation function J are calculated.

Thus, in step S22, the controller 24 selects, as the voltage vector V(n+1) at the next prediction cycle Tc(n+1), one of the voltage vectors V0 to V7 including the voltage vector V(n), a value of the evaluation function J of which is minimized in all of the voltage vectors V0 to V7 including the voltage vector V(n).

After completion of the operation in step S22 or after the affirmative determination of step S18, the controller 20 proceeds to step S24. In step S24, the controller 20 sets the voltage vectors V(n+1) and V(n) to the voltage vectors V(n) and V(n-1), the rotational angle θ(n) to the rotational angle θ(n-1), and the actual d- and q-axis currents id(n) and iq(n) to the actual d- and q-axis currents id(n-1) and iq(n-1). After the completion of the operation in step S24, the controller 20 exits the routine.

As described above, at the next prediction cycle Tc (n+1), the controller 20 generates, based on the selected one of the voltage vectors V0 to V7, the drive signals gup, gun, gvp, gvn, gwp, and gwn each with an adjusted value of the duty cycle. The controller 20 also outputs, to the respective switching elements Sup, Sun, Svp, Svn, Swp, and Swn, the generated drive signals gup, gun, gvp, gvn, gwp, and gwn.

Figure 4:
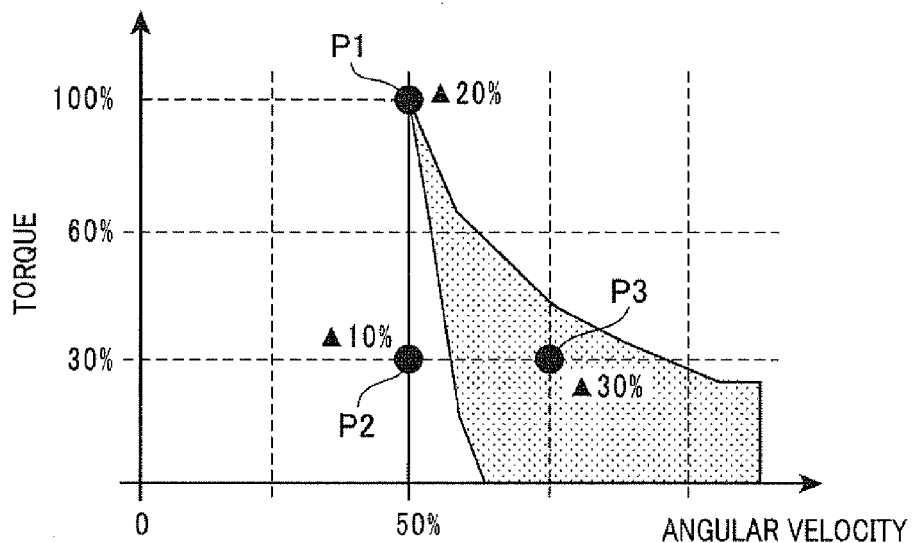
FIG. 4 is a graph schematically illustrating a benefit achieved by the control system illustrated in FIG. 1.
Figure 5:
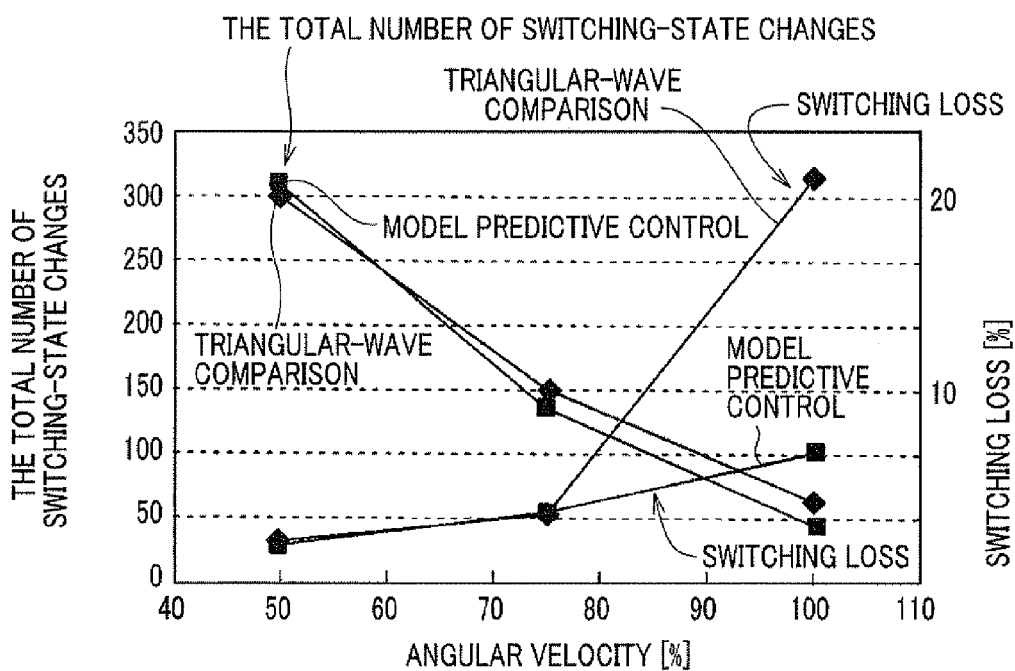
FIG. 5 is a graph schematically illustrating another benefit achieved by the control system illustrated in FIG. 1.

FIGS. 4 to 6 schematically illustrate benefits achieved by the control system CS.

Specifically, FIG. 4 schematically illustrates a graph. The graph demonstrates the percentage of the reduction in the total number of switching-state changes in the plurality of switching elements of the inverter IV during the inverter IV being driven under the model predictive control (see FIG. 3) to the total number of switching-state changes in the plurality of switching elements of the inverter IV during the inverter IV being driven by triangular-wave comparison PWM (Pulse Width Modulation) control. Note that the vertical axis of the graph represents the percentage of output torque to a predetermined allowable maximum output torque, and the horizontal axis of the graph represents the percentage of angular velocity to a predetermined allowable maximum angular velocity.

FIG. 4 shows that the total number of switching-state changes in the plurality of switching elements of the inverter IV during the inverter IV being driven under the model predictive control at each of three operating points P1, P2, and P3 plotted in the graph is more reduced than that of switching-state changes in the plurality of switching elements of the inverter IV during the inverter IV being driven by the triangular-wave comparison PWM control at a corresponding one of the three operating points P1, P2, and P3.

FIG. 5 schematically illustrates a graph. The graph includes a plot of the change in the number of switching-state changes in the plurality of switching elements of the inverter IV during the inverter IV being driven under the model predictive control versus the change in angular velocity. The graph also includes a plot of the change in the total number of switching-state changes in the plurality of switching elements of the inverter IV during the inverter IV being driven by the triangular-wave comparison PWM control versus the change in angular velocity.

Moreover, the graph includes a plot of the change in the switching loss of the inverter IV driven under the model predictive control versus the change in angular velocity, and a plot of the change in the switching loss of the inverter IV driven by the triangular-wave comparison PWM control versus the change in angular velocity. Note that the left vertical axis of the graph represents the total number of switching-state changes in the plurality of switching elements of the inverter IV during the inverter IV, and the right vertical axis of the graph represents the switching loss of each of the inverter IV and the conventional inverter. The horizontal axis of the graph represents the percentage of angular velocity to its upper limit until which the controllability of the inverter IV is not excessively reduced.

FIG. 5 shows that the model predictive control according to the first embodiment has advantages in the total number of switching-state changes in the plurality of switching elements of the inverter IV during the inverter IV and in the switching loss in comparison to the triangular-wave comparison PWM control.

Figure 3:
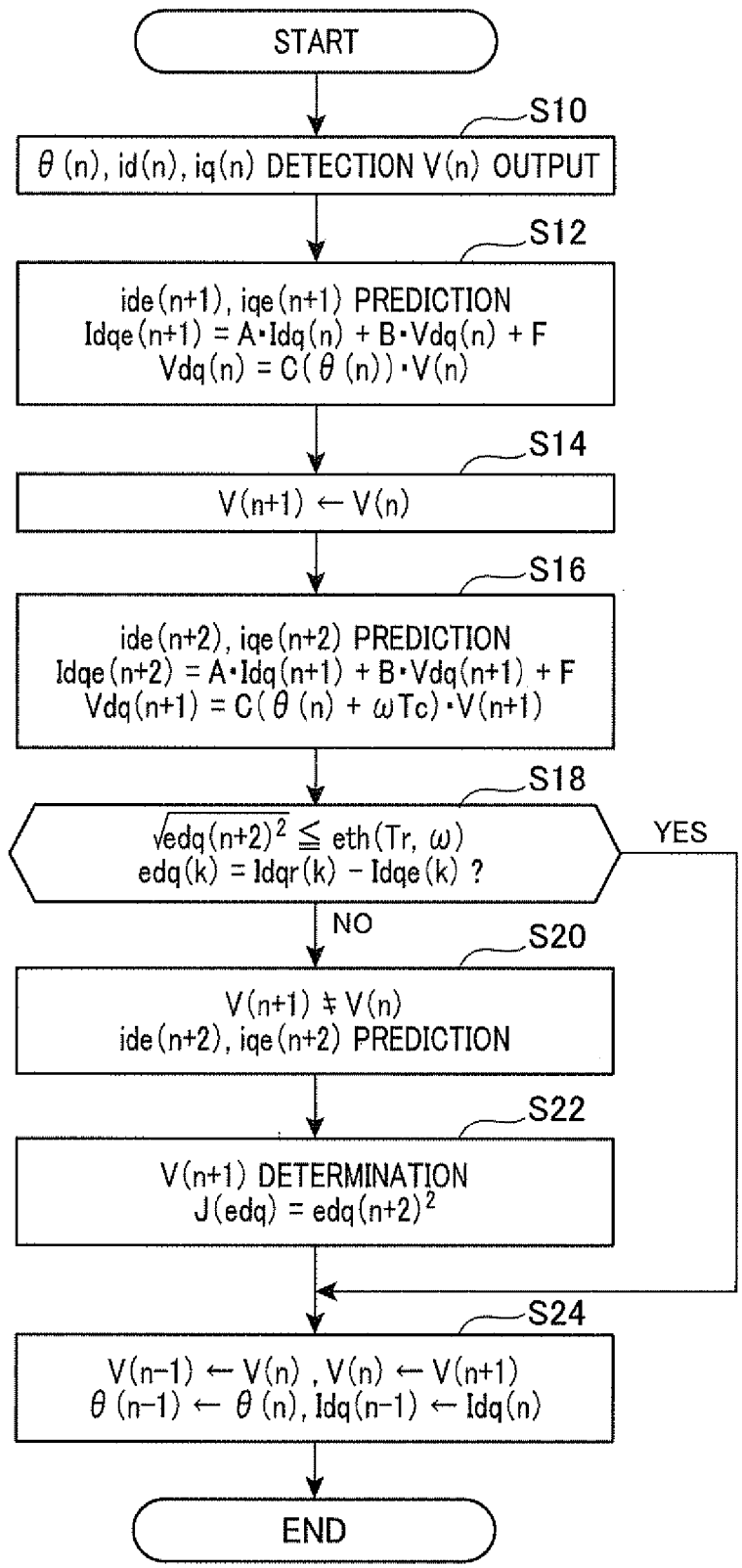
FIG. 3 is a flowchart schematically illustrating an example of a routine of model predictive control to be executed by the controller illustrated in FIG. 1.

FIG. 6A schematically illustrates the total number of switching-state changes in the plurality of switching elements of the inverter IV during the inverter IV being driven under the model predictive control illustrated in the flowchart in FIG. 3 without executing steps S14 to S18. The number of switching-state changes in the plurality of switching elements of the inverter IV during the inverter IV being driven under the model predictive control illustrated in the flowchart in FIG. 3 without executing steps S14 to S18 is represented as "BEFORE MEASURE" in FIG. 6A.

FIG. 6A also schematically illustrates the number of switching-state changes in the plurality of switching elements of the inverter IV during the inverter IV being driven under the model predictive control illustrated in the flowchart in FIG. 3. The number of switching-state changes in the plurality of switching elements of the inverter IV during the inverter IV being driven under the model predictive control illustrated in the flowchart in FIG. 3 is represented as "AFTER MEASURE" in FIG. 6A.

FIG. 6B schematically illustrates a plot of the change in the selected voltage vector versus the rotational position (angle) of the rotor in degrees relative to a predetermined reference position when the inverter IV is driven under the model predictive control illustrated in the flowchart in FIG. 3 without executing steps S14 to S18. FIG. 6B also schematically illustrates a plot of the change in each of the three-phase instantaneous current values iu, iv, and iw versus the rotational position of the rotor in degrees relative to the predetermined reference position when the inverter IV is driven under the model predictive control illustrated in the flowchart in FIG. 3 without executing steps S14 to S18.

FIG. 6C schematically illustrates a plot of the change in the selected voltage vector versus the rotational position of the rotor in degrees relative to the predetermined reference position when the inverter IV is driven under the model predictive control illustrated in the flowchart in FIG. 3. FIG. 6C also schematically illustrates a plot of the change in each of the three-phase instantaneous current values iu, iv, and iw versus the rotational position of the rotor in degrees relative to the predetermined reference position when the inverter IV is driven under the model predictive control illustrated in the flowchart in FIG. 3.

FIG. 6A shows that the total number of switching-state changes in the plurality of switching elements of the inverter IV during the inverter IV being driven under the model predictive control illustrated in the flowchart of FIG. 3 is significantly reduced in comparison to the total number of switching-state changes in the plurality of switching elements of the inverter IV during the inverter IV being driven under the model predictive control illustrated in the flowchart in FIG. 3 without executing steps S14 to S18.

As described above, the control system CS according to the first embodiment is configured to:

determine whether the deviation edq of a present command current vector Idqr from a predicted current vector Idqe is equal to or less than the switching-limitation priority threshold eth when temporarily setting a present switching mode of the inverter IV as the next switching mode thereof; and determine the present switching mode of the inverter IV as the next switching mode thereof upon determining that the deviation edq of the present command current vector Idqr from the predicted current vector Idqe is equal to or less than the switching-limitation priority threshold eth.

This configuration achieves the first benefit of effectively reducing the frequency of switching-state changes of the plurality of switching elements of the inverter IV, thus reducing the switching loss of the inverter IV.

The control system CS is also configured to consider the use of another switching mode (another switching vector) only when the deviation edq of the present command current vector Idqr from the predicted current vector Idqe is greater than the switching-limitation priority threshold eth. This configuration achieves the second benefit of reducing the calculating load of the controller 20.

The control system CS is configured to variably set the switching-limitation priority threshold eth according to the request torque Tr and the rotational velocity ω. This configuration achieves the third benefit of allowing the switching-limitation priority threshold eth to be set to achieve various control performances of the control system CS that meet various needs for the motor-generator 10.

The control system CS is configured to use, as the initial values of the d- and q-axis currents id and iq in the equations [c3] and [c4], d-axis and q-axis current values ide(n+1) and iqe(n+1) predicted based on the already determined switching mode (the voltage vector V(n)) to be used to control the inverter IV, thus predicting the d-axis current value ide(n+2) and q-axis current value iqe(n+2) at the prediction cycle Tc (n+2).

This configuration achieves the fourth benefit of predicting the d-axis current value ide(n+2) and q-axis current value iqe(n+2) at high accuracy.

The control system CS is configured to determine the switching mode of the inverter IV at the prediction cycle Tc (n+1) based on the d-axis current value ide(n+2) and q-axis current value iqe(n+2) at the prediction cycle Tc (n+2). This configuration achieves the fifth benefit of predicting the d-axis current value ide(n+2) and q-axis current value iqe(n+2) at high accuracy.

The control system CS is configured to use the predicted d-axis and q-axis currents id(n+1) and iq(n+1) at the prediction cycle Tc (n+1) as initial values of the d- and q-axis currents id and iq in the equations [c3] and [c4] required to predict the d-axis and q-axis current values ide(n+2) and iqe(n+2) at the prediction cycle Tc (n+2).

This configuration achieves the sixth benefit of matching the first process of predicting the d-axis and q-axis currents id(n+1) and iq(n+1) at the prediction cycle Tc (n+1) with the second process of predicting initial values of the d- and q-axis currents id and iq in the equations [c3] and [c4] required to predict the d-axis and q-axis current values ide(n+2) and iqe(n+2) at the prediction cycle Tc (n+2). Thus, it is possible to facilitate the design of the predictor 33 and/or the routine illustrated in FIG. 3, and share part of the hardware and/or programmed-logic of the predictor 33 between the first process and the second process.

Second Embodiment

A control system according to the second embodiment of the present invention will be described hereinafter with reference to FIG. 7.

The structure of the control system according to the second embodiment is substantially identical to that of the control system CS according to the first embodiment except for the following different points. So, like parts and functional modules between the control systems according to the first and second embodiments, to which like reference characters are assigned, are omitted or simplified in description.

A routine of the model predictive control to be executed by the controller 20 according to the second embodiment will be described hereinafter with reference to FIG. 7 in place of FIG. 3. In FIG. 7, like operations between the routines in FIGS. 3 and 7, to which like numbered steps are assigned, are omitted in description.

After the operation in step S16, the controller 20 determines whether the norm $\sqrt{edq(n+2)^2}$ is equal to or less than a switching-limitation priority threshold eth in step S18a. In step S18a, the controller 20 variably sets the switching-limitation priority threshold eth as a function of the three-phase instantaneous current values flowing in the motor-generator 10, the rotational velocity ω, and the temperature Tem of or around the motor-generator 10.

Note that a current flowing in the motor-generator 10 is a parameter that changes the ratio (accuracy), to the output torque, of the deviation of the output torque from the request torque even with the same value of the switching-limitation priority threshold eth.

For this reason, in step S18a, the controller 20 can set the switching-limitation priority threshold eth based on the magnitude of a current flowing in the motor-generator 10 according to how identifiable the ratio (accuracy) is required independently of the operating conditions of the motor-generator 10.

In step S18a, the controller 20 can set the switching-limitation priority threshold eth based on the magnitude of a current flowing in the motor-generator 10 because the magnitude of the current correlates with the switching loss of the inverter IV.

In addition, the temperature Tem of or around the motor-generator 10 is a parameter associated with the copper loss of the motor-generator 10. Specifically, the more the temperature Tem of or around the motor-generator 10 increases, the more the copper loss of the motor-generator 10 increases.

For this reason, in step S18a, the controller 20 can set the switching-limitation priority threshold eth based on the temperature Tem of or around the motor-generator 10 according to how much the copper loss of the motor-generator 10 is reduced.

Figure 7:
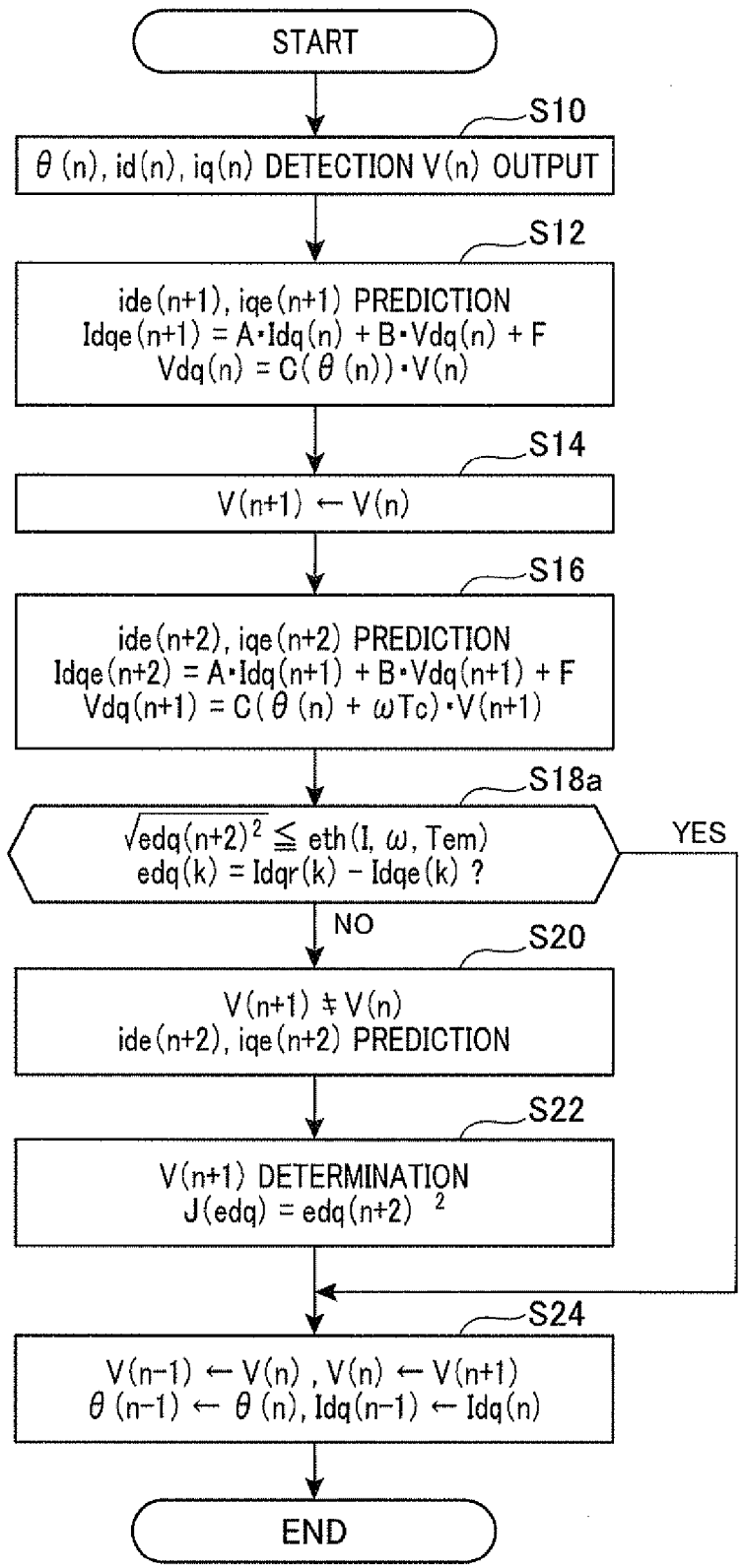
FIG. 7 is a flowchart schematically illustrating an example of a routine of the model predictive control to be executed by the controller according to the second embodiment of the present invention.

The remaining operations in the routine illustrated in FIG. 7 are identical to those in the routine illustrated in FIG. 3.

As described above, the control system according to the second embodiment achieves substantially the same benefits as the control system CS according to the first embodiment.

Third Embodiment

Figure 8:
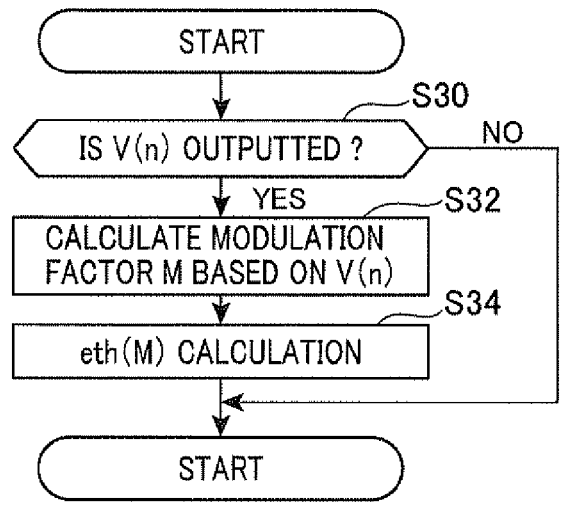
FIG. 8 is a flowchart schematically illustrating an example of a routine to set a switching-limitation priority threshold to be repeatedly executed by the controller according to the third embodiment of the present invention.

A control system according to the third embodiment of the present invention will be described hereinafter with reference to FIG. 8.

The structure of the control system according to the third embodiment is substantially identical to that of the control system CS according to the first embodiment except for the following different points. So, like parts and functional modules between the control systems according to the first and third embodiments, to which like reference characters are assigned, are omitted or simplified in description.

The control system according to the third embodiment is configured to variably set the switching-limitation priority threshold eth depending on a modulation factor M of the inverter IV.

Next, a routine to set the switching-limitation priority threshold eth to be repeatedly executed by the controller 20 at a preset cycle will be described hereinafter with reference to FIG. 8.

When the routine is launched, the controller 20 determines whether the present timing is the update timing of the drive mode of the inverter IV (the output timing of the voltage vector V(n)) in step S30.

Upon determining that the present timing is the update timing of the drive mode of the inverter IV (YES in step S30), the controller 20 calculates the modulation factor M of the inverter IV based on the presently used voltage vector V(n) used as an input in step S32.

Specifically, the controller 20 calculates the norm of voltage vector V(n) by executing the moving-average process of the voltage vector V(n), and calculates the modulation factor M of the inverter IV based on the norm of the voltage vector V(n) and the battery voltage VDC in step S32.

Note that the modulation factor M of the inverter IV is defined as the Fourier coefficient (amplitude) of each of the fundamental waves of the three-phase output voltages of the inverter IV. Therefore, the modulation factor M can be calculated based on the Fourier coefficient (amplitude) of each of the fundamental waves of the three-phase output voltages of the inverter IV when the amplitude of each of the fundamental waves is normalized by the VDC/2. Each of the fundamental waves of the output voltages of the inverter IV is a sinusoidal wave with the frequency of $2\pi/\omega$; ω is the rotational velocity of the rotor of the motor-generator 10. In calculation of the Fourier coefficient, the controller 20 matches the center of the peak-to-peak amplitude of each of the fundamental waves with the median value of the fluctuating range of the output voltages of the inverter V.

Otherwise, when the operation in step S34 is completed, or the determination in step S30 is negative, the controller 20 exits the routine.

As described above, the control system according to the third embodiment achieves substantially the same benefits as the control system CS according to the first embodiment.

Fourth Embodiment

Figure 9:
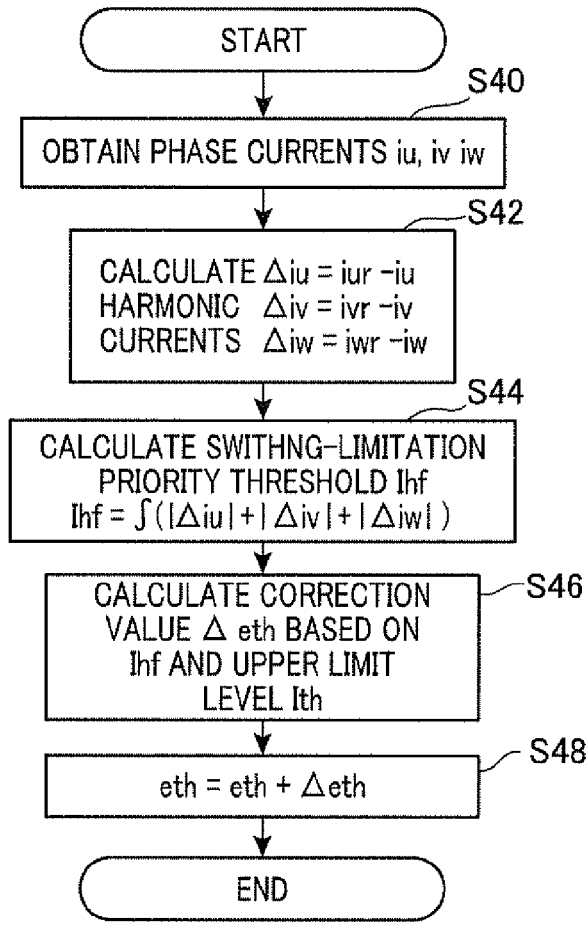
FIG. 9 is a flowchart schematically illustrating an example of a routine to set a switching-limitation priority threshold to be repeatedly executed by the controller according to the fourth embodiment of the present invention.

A control system according to the fourth embodiment of the present invention will be described hereinafter with reference to FIG. 9.

The structure of the control system according to the fourth embodiment is substantially identical to that of the control system CS according to the first embodiment except for the following different points. So, like parts and functional modules between the control systems according to the first and fourth embodiments, to which like reference characters are assigned, are omitted or simplified in description.

The control system according to the fourth embodiment is configured to operate the switching-limitation priority threshold eth to thereby feedback control harmonic components of three-phase currents flowing in the motor-generator 10 to their upper limit levels.

Next, a routine to set the switching-limitation priority threshold eth to be repeatedly executed by the controller 20 at a preset cycle will be described hereinafter with reference to FIG. 9.

When the routine is launched, the controller 20 captures the three-phase instantaneous current values iu, iv, and iw measured by the current sensor 16 in step S40. Next, the controller 20 calculates three-phase harmonic currents Δiu, Δiv, and Δiw by subtracting the three-phase instantaneous current values iu, iv, and iw from three-phase command currents iur, ivr, and iwr, respectively in step S42. In step S42, the controller 20 can obtain the three-phase command currents iur, ivr, and iwr by converting the d-axis command current idr and the q-axis command current iqr into the three-phase command currents iur, ivr, and iwr based on the actual rotational angle θ.

Next, the controller 20 calculates a substantially harmonic-current effective value Ihf in step S44. For example, in the fourth embodiment, the controller 20 integrates the sum of the absolute values of the three-phase harmonic currents Δiu, Δiv, and Δiw over one electric angle in step S44. Subsequently, the controller 20 calculates, as a manipulated variable to feedback control the substantially harmonic-current effective value Ihf to an upper limit level Ith, a correction value Δeth for the switching-limitation priority threshold eth in step S46.

Next, the controller 20 corrects the switching-limitation priority threshold eth based on the correction value Δeth by, for example, adding, to the switching-limitation priority eth, the correction value Δeth in step S48

This results in that the harmonic components of the three-phase currents flowing in the motor-generator 10 are maintained to be lower than their upper limit levels corresponding to the upper limit level Ith.

As described above, the control system according to the fourth embodiment is configured to operate the switching-limitation priority threshold eth to thereby feedback control the harmonic components of the three-phase currents flowing in the motor-generator 10 to be lower than their upper limit levels. This configuration achieves, in addition to the first to sixth benefits, the seventh benefit of reliably reducing the harmonic currents, thus reducing the iron loss of the motor-generator 10.

Fifth Embodiment

A control system according to the fifth embodiment of the present invention will be described hereinafter with reference to FIG. 10.

The structure of the control system according to the fifth embodiment is substantially identical to that of the control system CS according to the first embodiment except for the following different points. So, like parts and functional modules between the control systems according to the first and fifth embodiments, to which like reference characters are assigned, are omitted or simplified in description.

A routine of the model predictive control to be executed by the controller 20 according to the fifth embodiment will be described hereinafter with reference to FIG. 10 in place of FIG. 3. In FIG. 10, like operations between the routines in FIGS. 3 and 10, to which like numbered steps are assigned, are omitted in description.

Figure 10:
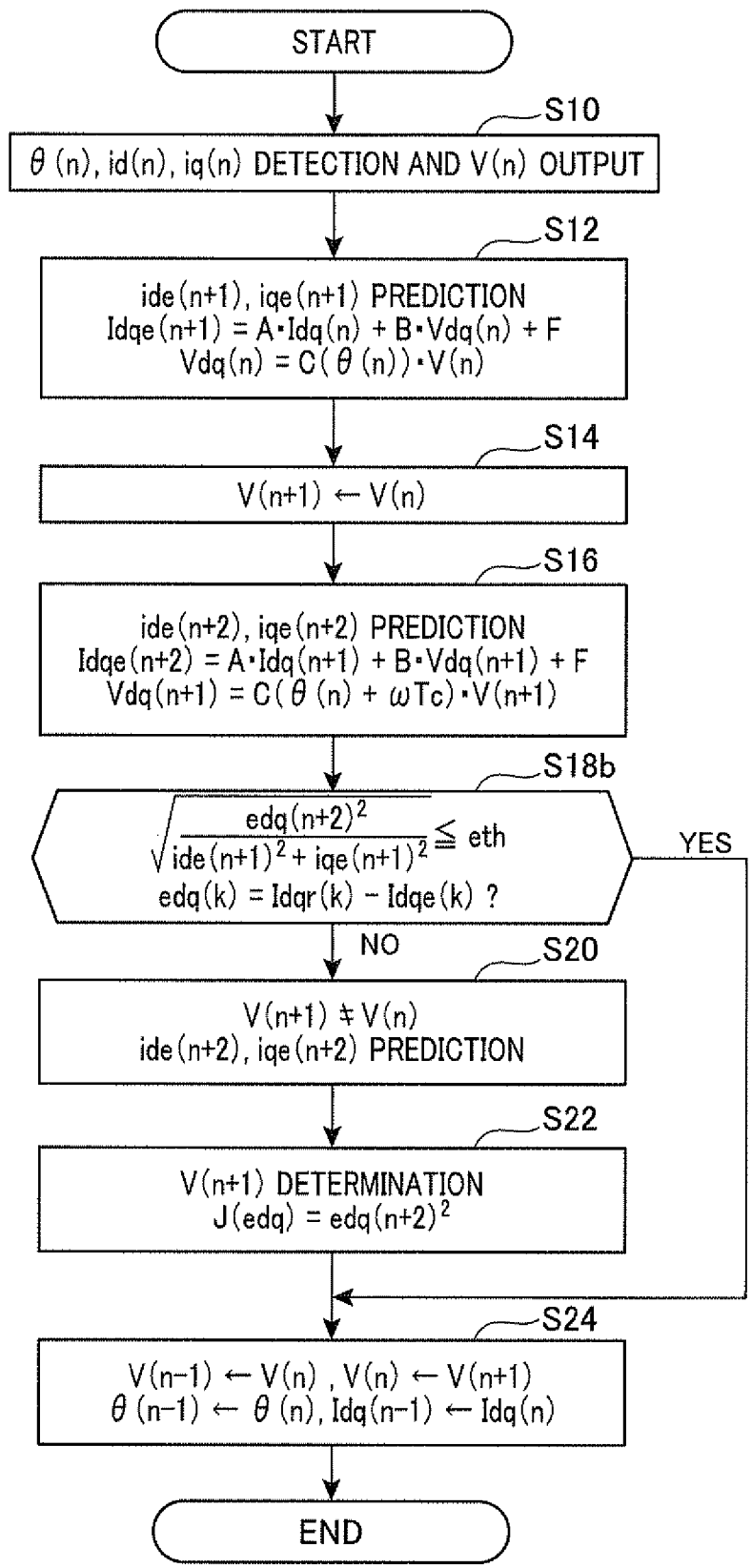
FIG. 10 is a flowchart schematically illustrating an example of a routine of the model predictive control to be executed by the controller according to the fifth embodiment of the present invention.

In the routine illustrated in FIG. 10, the switching-limitation priority threshold eth is set to be a fixed value indicative of the ratio of the deviation edq to the d- and q-axis command current vector Idqr (idr, iqr).

Specifically, after the operation in step S16, the controller 20 divides the square of the deviation edq(n+2) by the square of the norm $\sqrt{idr(n+1)^2 + iqr(n+1)^2}$ to thereby obtain a value of edq(n+2)²/{idr(n+1)²+iqr(n+1)²} in step S18b.

Next, in step S18b, the controller 20 calculates the square root of the value of edq(n+2)²/{idr(n+1)²+iqr(n+1)²} to thereby obtain a value of $$\sqrt{\frac{edq(n+2)^2}{idr(n+1)^2 + iqr(n+1)^2}}.$$

Then, in step S18, the controller 20 determines whether the value of $$\sqrt{\frac{edq(n+2)^2}{idr(n+1)^2 + iqr(n+1)^2}}$$

is equal to or less than the switching-limitation priority threshold eth.

The remaining operations in the routine illustrated in FIG. 10 are identical to those in the routine illustrated in FIG. 3.

As described above, the control system according to the fifth embodiment is configured to set the switching-limitation priority threshold eth to a fixed value as an allowable range of the ratio of the deviation edq(n+2) to the d- and q-axis command currents idr(n+1) and iqr(n+1). This configuration achieves, in addition to the first, second, and fourth to sixth benefits, the eighth benefit of maintaining the control accuracy of the three-phase currents flowing in the motor-generator 10 at a constant level even if the switching-limitation priority threshold eth is set to the fixed value.

Sixth Embodiment

A control system according to the sixth embodiment of the present invention will be described hereinafter with reference to FIG. 11.

The structure of the control system according to the sixth embodiment is substantially identical to that of the control system CS according to the first embodiment except for the following different points. So, like parts and functional modules between the control systems according to the first and sixth embodiments, to which like reference characters are assigned, are omitted or simplified in description.

A routine of the model predictive control to be executed by the controller 20 according to the sixth embodiment will be described hereinafter with reference to FIG. 11 in place of FIG. 3. In FIG. 11, like operations between the routines in FIGS. 3 and 11, to which like numbered steps are assigned, are omitted in description. In the sixth embodiment, the reference character "H" of the voltage vectors Vi represents "1", and the reference character "L" of the voltage vectors Vi represents "0".

The control system according to the sixth embodiment is configured to calculate the deviation edq(n+2) in stages in ascending order of their corresponding numbers of switching-state changes as long as the deviation edq(n+2) is greater than the switching-limitation priority threshold eth.

Figure 11:
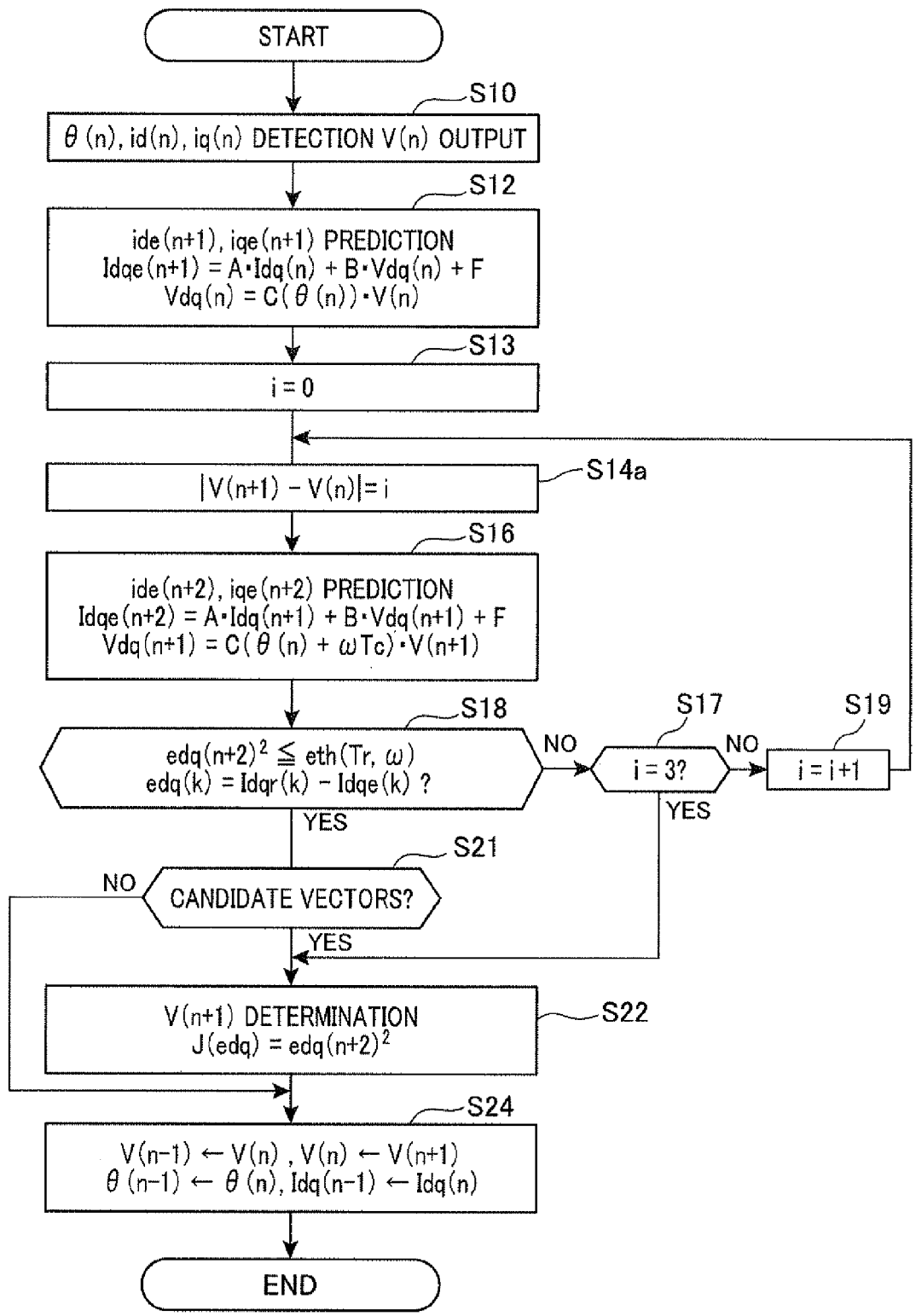
FIG. 11 is a flowchart schematically illustrating an example of a routine of the model predictive control to be executed by the controller according to the sixth embodiment of the present invention.

In the routine illustrated in FIG. 11, after completion of the operation in step S12, the controller 20 sets, to "1", a variable i that specifies one of the eight voltage vectors in step S13.

Next, the controller 20 sets the voltage vector V(n+1) at the next prediction cycle Tc(n+1) such that the square of the norm of the difference between the voltage vector V(n+1) and the voltage vector V(n) at the present prediction cycle Tc(n) is equal to the variable i in step S14a.

In step S16, the controller 20 calculates, based on the voltage vector V(n+1) set in step S14a, the d-axis current value ide(n+2) and q-axis current value iqe(n+2) at the prediction cycle Tc (n+2) in accordance with the discretized equation model.

Next, the controller 20 determines whether the norm $\sqrt{edq(n+2)^2}$ is equal to or less than a switching-limitation priority threshold eth in step S18.

Upon determining that the norm $\sqrt{edq(n+2)^2}$ is greater than the switching-limitation priority threshold eth (NO in step S18), the controller 20 increments the variable i in step S19 as long as the variable i is unequal to 3 (NO in step S17), returning to step S14a and repeating the operations in steps S14a to S19.

On the other hand, upon determining that the norm $\sqrt{edq(n+2)^2}$ is equal to or less than the switching-limitation priority threshold eth (YES in step S18), the controller 20 proceeds to step S21 and determines whether there are voltage vectors each meeting that the corresponding norm $\sqrt{edq(n+2)^2}$ is equal to or less than the switching-limitation priority threshold eth in step S21. The operation in step S21 is required because there are candidate voltage vectors each meeting that the corresponding norm $\sqrt{edq(n+2)^2}$ is equal to or less than the switching-limitation priority threshold eth when the variable i is set to 1 or 2.

Upon determining that there are candidate voltage vectors each meeting that the corresponding norm $edq(n+2)^2$ is equal to or less than the switching-limitation priority threshold eth (YES in step S21), or that the variable i is equal to 3 (YES in step S17), the controller 20 proceeds to step S22.

In step S22, the controller 20 carries out an operation to determine the voltage vector V(n+1) at the next prediction cycle Tc (n+1) using the evaluation functions J.

Specifically, when the affirmative determination is carried out in step S21, the controller 20 determines, as the target voltage vector V(n+1) at the next prediction cycle Tc(n+1), one of the candidate voltage vectors; this one of the candidate voltage vectors minimizes the evaluation function J.

On the other hand, when the affirmative determination is carried out in step S17, the controller 20 determines, as the target voltage vector V(n+1) at the next prediction cycle Tc(n+1), one of the voltage vectors V0 to V7; this one of the voltage vectors V0 to V7 minimizes the evaluation function J in all of the voltage vectors V0 to V7.

Otherwise, when the operation in step S22 is completed or the negative determination is carried out in step S21, the controller 20 proceeds to step S24 and carries out the operation in step S24 set forth above.

As described above, the control system according to the sixth embodiment is configured to achieve substantially the same benefits as the control system CS according to the first embodiment.

Seventh Embodiment

A control system CS1 according to the seventh embodiment of the present invention will be described hereinafter with reference to FIG. 12.

The structure of the control system CS1 according to the seventh embodiment is substantially identical to that of the control system CS according to the first embodiment except for the following different points. So, like parts and functional modules between the control systems according to the first and third embodiments, to which like reference characters are assigned, are omitted or simplified in description.

The control system CS1 is designed to determine, according to a predicted value and a command value of each of the output torque of the motor-generator 10 and that of the magnetic flux to be created thereby, the drive mode of the inverter IV.

Figure 12:
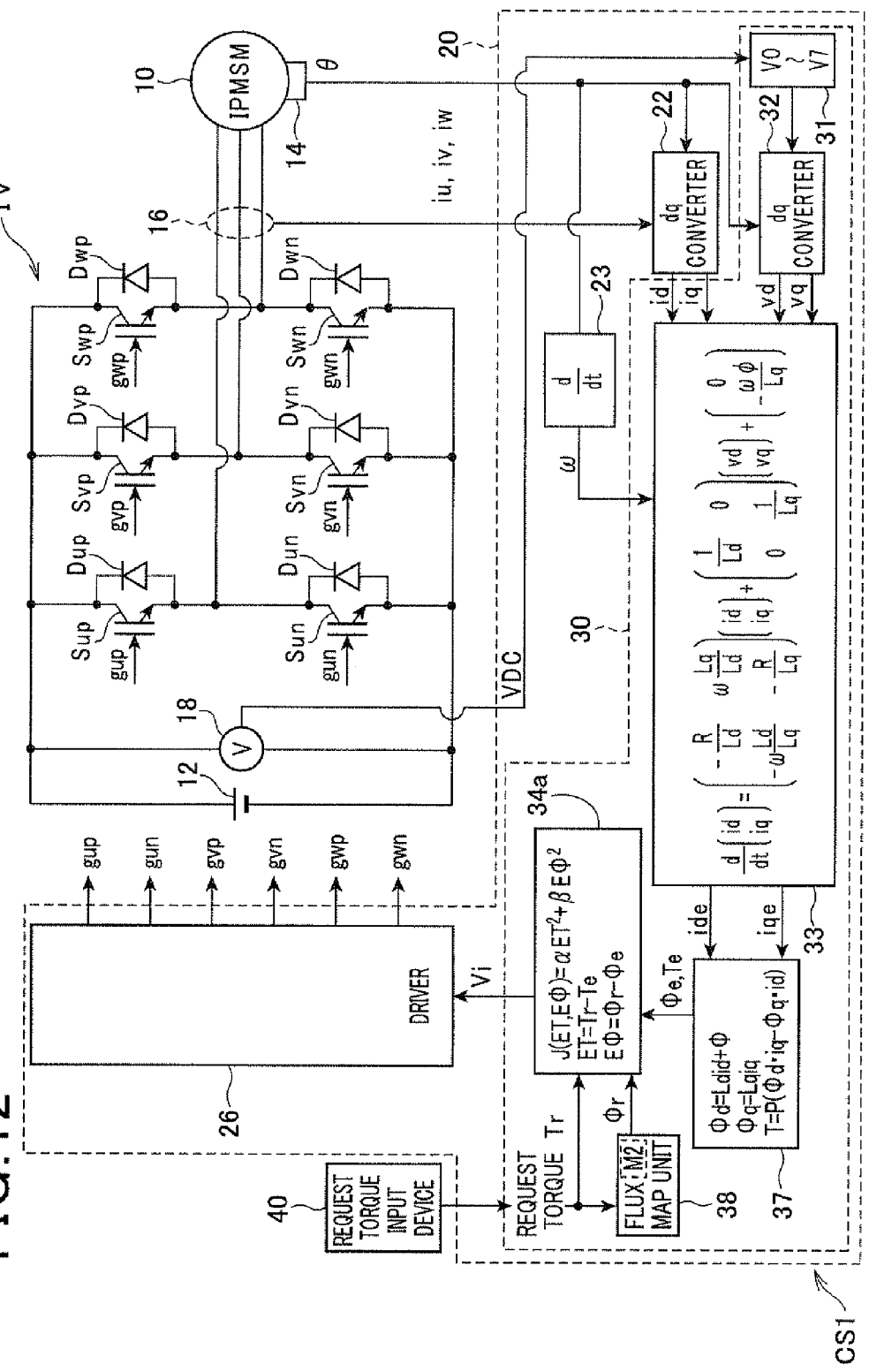
FIG. 12 is a circuit and block diagram of a control system according to the seventh embodiment of the present invention.

Referring to FIG. 12, the controller 20 includes a torque/flux predictor 37 and a flux map unit 38 in place of the command current setter 24.

The torque/flux predictor 37 is operative to predict, based on the predicted d- and q-axis current values ide and iqe, a flux vector Φe that should be generated in the d-q coordinate system. The predicted flux vector Φe in the d-q coordinate system consists of a predicted d-axis component Φd and a predicted q-axis component Φq.

In the seventh embodiment, the torque/flux predictor 37 is operative to predict, based on the predicted d- and q-axis current values ide and iqe, the predicted flux vector Φe (Φd, Φq) in accordance with the following equations [c5] and [c6]:

$$\Phi d = Ld \cdot id + \phi \quad [c5]$$

$$\Phi q = Lq \cdot iq \quad [c6]$$

In addition, the torque/flux predictor 37 is operative to predict, based on the predicted d- and q-axis current values ide and iqe, a torque Te that should be generated in the motor-generator 10 in accordance with the following equation [c7]:

$$Te = P(\Phi d \cdot iq - \Phi q \cdot id) \quad [c7]$$

where P represents the number of pole pair of the rotor.

The flux map unit 38 stores therein a map M2 comprised of, for example, a data table, an equation, or a program. The map M2 represents a function (relationship) between a variable of the request torque Tr and a variable of a request flux vector Φr. For example, in the seventh embodiment, the function represented by the map M2 is designed to provide one of various operations modes, such as maximum torque control mode that achieves maximum torque with a constant magnitude of the predicted current vector Idqe.

Based on the map M2, the flux map unit 38 sets the request flux vector Φr corresponding to the input value of the request torque Tr.

The controller 20 includes a drive mode determiner 34a having a function that is slightly different from the function of the drive mode determiner 34 illustrated in FIG. 1.

Specifically, the drive mode determiner 34a carries out an operation to determine the voltage vector V(n+1) at the next prediction cycle Tc(n+1) using the evaluation function J.

The drive mode determiner 34a quantifies the evaluation function J based on the deviation EΦ of the request flux vector Φr from the predicted flux vector Φe(Φd, Φq) and the deviation ET of the request torque Tr from the predicted torque Te.

Specifically, the drive mode determiner 34a determines the evaluation function J as the sum of the product of a weighing coefficient α and the square of the deviation ET and the product of a weighting coefficient β of the square of the deviation EΦ. The weighting coefficients α and β are determined based on the fact that the torque and the magnetic flux to be generated in the motor-generator 10 are different in magnitude from each other.

That is, when the request torque Tr is set such that the magnitude of the torque to be generated in the motor-generator 10 is greater than that of the magnetic flux to be generated therein, the deviation ET is likely to be greater than the deviation EΦ. For this reason, when no weighting coefficients α and β were used, even if a voltage vector is selected with low controllability of the magnetic flux, the evaluation of the voltage vector would not be reduced so much.

For this reason, the weighting coefficients α and β are used to compensate the difference in magnitude between the deviation ET and the deviation EΦ.

Note that the predicted torque Te and the predicted flux vector Φe are calculated based on the predicted d-axis current value id and q-axis current value iq as their initial values in the same manner as the first embodiment.

Specifically, the control system CS1 according to the seventh embodiment has no hardware means to directly detect the torque and/or magnetic flux to be generated in the motor-generator 10. For this reason, the control system CS1 calculates the torque and/or the magnetic flux as controlled variables of the motor-generator 10 based on a current flowing in the motor-generator 10; this drive current is a physical variable expressed as a function of the controlled variables.

The control system CS1 is configured to use the predicted d-axis currents id(n+1) and iq(n+1) at the prediction cycle Tc(n+1) as initial values of the d- and q-axis currents id and iq in the equations [c3] and [c4] required to predict the torque Te(n+2) and the flux vector Φe(n+2) at the prediction cycle Tc(n+2).

Each of the first to seventh embodiments can be modified in the following manners.

Input parameters to variably set the switching-limitation priority threshold eth are not limited to those in combination or alone described in the first to fourth, sixth, and seventh embodiments. Specifically, the switching-limitation priority threshold eth can be variably set based on at least one of the temperature of the motor-generator 10, a current flowing in the motor-generator 10, the output torque T, the angular velocity ω, and the modulation factor M.

Similarly, the switching-limitation priority threshold eth for feedback controlling the substantially harmonic-current effective value Ihf to the upper limit level Ith can be variably set based on at least one of the temperature of the motor-generator 10, a current flowing in the motor-generator 10, the output torque T, the angular velocity ω, and the modulation factor M. The switching-limitation priority threshold eth can be fixed except for the process of feedback controlling the substantially harmonic-current effective value Ihf to the upper limit level Ith.

In each of the first to seventh embodiments, the switching-limitation priority threshold eth is set for the not of the deviation of the command current vector Idqr from the predicted current vector Idqe, but the present invention is not limited thereto. Specifically, a threshold can be set to each of the deviation of the d-axis command current idr from the predicted d-axis current value ide and of the deviation of the q-axis command current iqr from the predicted q-axis current value iqe.

In each of the first to third, and fifth to seventh embodiments, the switching-limitation priority threshold eth can be set to be applied to feedback control harmonic currents to their upper limit levels according to the method disclosed in the fourth embodiment.

In each of the first to seventh embodiments, when the deviation of a predicted value of a controlled variable based on the present voltage vector V(n) from a command value therefor is within a preset range, the controller does not carry out prediction of a value of the controlled variable based on another voltage vector. However, the present invention is not limited to the structure.

Specifically, the controller can predict a value of a controlled variable for each of the voltage vectors V0 to V7 every prediction cycle. In this modification, the controller can determine one of the voltage vectors based on their values of the evaluation function J when the deviation of the predicted value of the controlled variable based on the present voltage vector V(n) from the command value therefor is not within a preset range.

In each of the first to seventh embodiments, when the difference between a predicted value of a controlled variable and a command value therefor is within a preset range, a corresponding voltage vector is determined as a final voltage vector; the number of switching-state changes based on the final voltage vector is minimized. The present invention is however not limited to the structure.

Specifically, when the deviation between a predicted value of a controlled variable and a command value therefor is within a preset range for each of candidate voltage vectors in the voltage vectors V0 to V7, a first voltage vector with the minimum number of switching-state changes and a second voltage vector with the minimum number of switching-state changes next to the first voltage vector can be extracted from the candidate voltage vectors. Thereafter, one of the first and second voltage vectors can be determined as a final voltage vector; the value of the evaluation function J of the one of the first and second voltage vectors is higher in evaluation than that of the evaluation function J of the other thereof.

Otherwise, when the deviation between a predicted value of a controlled variable and a command value therefor is within a preset range for each of candidate voltage vectors in the voltage vectors V0 to V7, a first voltage vector with the minimum number of switching-state changes and a second voltage vector with the minimum number of switching-state changes next to the first voltage vector can be extracted from the candidate voltage vectors. Thereafter, one of the first and second voltage vectors can be determined as a final voltage vector; the weighted value of the evaluation function J based on the corresponding number of switching-state changes of the one of the first and second voltage vectors is higher in evaluation than that of the evaluation function J of the other thereof.

In each of the first to fifth and seventh embodiments, when the norm $\sqrt{edq(n+2)^2}$ based on the present voltage vector V(n) is greater than the switching-limitation priority threshold eth, the controller 20 predicts a value of a controlled variable for each of the remaining voltage vectors, but the present invention is not limited to the structure.

Specifically, when the voltage vectors V0 and V7 is included in the remaining voltage vectors, the controller 20 can predict a value of a controlled variable for only one of the voltage vectors V0 and V7. Similarly, in the sixth embodiment, the controller 20 can predict a value of a controlled variable for only one of the voltage vectors V0 and V7.

In each of the first to seventh embodiments, the controller 20 predicts a value of a controlled variable associated with the drive mode of the inverter IV at the next prediction cycle (one prediction cycle after the present prediction cycle), but the present invention is not limited thereto.

Specifically, the controller 20 can successively predict values of a controlled variable at respective several prediction cycles after the present prediction cycle, thus determining the drive mode of the inverter IV at the next prediction cycle. In this modification, it is effective to limit the change of the drive mode of the inverter IV when the deviation between a command value of a controlled variable and a command value therefor is within a preset range.

In each of the first to seventh embodiments, the controller 20 obtains the actual d-axis and q-axis currents id(n) and iq(n) each time the drive mode of the inverter IV is updated, but the present invention is not limited thereto. Specifically, the controller 20 can obtain the actual d-axis and q-axis currents id and iq at the temporally center timing of each of the intervals between the respective adjacent timings of sequential update timings of the drive mode of the inverter IV. In this modification, it is effective to predict, based on the obtained actual d-axis and q-axis currents id and iq at the temporally center timing of the interval between the present prediction timing and the next prediction timing, the d-axis and q-axis currents id and iq at the next update timing as initial values required to predict the drive mode of the inverter V at the next update timing.

In each of the first to seventh embodiments, the controller 20 predicts a value of a controlled variable associated with the drive mode of the inverter IV one prediction cycle after the present prediction cycle, but the present invention is not limited thereto. Specifically, the controller 20 can predict a value of a controlled variable associated with the drive mode of the inverter IV at a point of time within a period from the present update timing of the inverter IV to the next update timing thereof.

The equation model can be discretized using the forward difference method as an example of difference methods, but it can be discretized using a linear M-step method (M is equal to or greater than 2), Runge Kutta method, or the like.

In each of the first to seventh embodiments, the equation model without considering the stator iron loss is used to predict a value of a controlled variable of the motor-generator 10, but an equation model considering the stator iron loss can be used to predict a value of a controlled variable of the motor-generator 10.

The equation model based on fundamental-wave drive, such as fundamental sinusoidal drive, is used to describe the motor-generator 10, but an equation model based on periodic-wave drive containing harmonic components can be used to describe the motor-generator 10. For example, an equation model in consideration of harmonic components of inductance and those of induced voltage can be used to describe the motor-generator 10.

In each of the first to seventh embodiments, as a predicting unit to predict a value of a current flowing in the motor-generator 10, a map can be used: this map means a storage unit that has stored therein values of at least one output parameter as the drive current corresponding to discrete values of at least one input parameter.

For example, as the at least one input parameter to the map, d- and q-axis voltages (vd, vq) or the electric angular velocity ω can be used.

In each of the first to seventh embodiments, a target controlled variable of the motor-generator 10, which is finally required to be set to a desired value, is any one of a current flowing in the motor-generator 10, and a torque and a magnetic flux to be generated therein, but the present invention is not limited thereto. Only one of a current flowing in the motor-generator 10, and a torque and a magnetic flux to be generated therein, can be used as a target controlled variable of the motor-generator 10. In this modification, when either a torque or a magnetic flux to be generated in the motor-generator 10 is used as a target controlled variable of the motor-generator 10, a target physical variable to be detected by the sensor 16 can be set except for a current flowing in the motor-generator 10.

In each of the first to seventh embodiments, a target controlled variable of the motor-generator 10, which is finally required to be set to a desired value irrespective of a variable to be predicted, is a torque to be generated in the motor-generator 10, but the rotational speed of the motor-generator can be used as the target controlled variable of the motor-generator 10.

In each of the first to seventh embodiments, the actual rotational angle θ of the rotor is measured by the angular sensor 14, but it can be obtained according to the actual d- and q-axis currents.

In the third embodiment, the modulation factor M is calculated based on the selected voltage vector V(n), but can be calculated based on the norm of the voltage vector calculated in accordance with the equations [c1] and [c2] from which the term of the differential operator p has been eliminated.

In the fourth embodiment, the control system calculates the substantially harmonic-current effective value Ihf based on the three-phase harmonic currents in the three-phase stationary coordinate system defined in the stator, but the present invention is not limited thereto. Specifically, the control system can calculate the substantially harmonic-current effective value Ihf based on one-phase or two-phase harmonic currents and/or based on at least one of d- and q-axis current components in the rotating coordinate system.

In each of the first to seventh embodiments, as the motor-generator 10, an IPMSM is used, but another type of rotary machines, such as synchronous motors including a surface-magnet motor and a field-winding synchronous motor and induction motors including an induction motor can be used.

Various types of rotary machines according to the present invention can be installed in various types of vehicle, such as an electric automobile. Various types of rotary machines to which the present invention can be applied are not limited to a component of a drive system of vehicles.

The high-voltage battery 12 is used as a direct-current power source, but a capacitor that boosts up the battery voltage across the battery 12 can be used as the direct-current power source.

In each of the first to seventh embodiments, as a power converter having a switching element that selectively establishes electrical connection and electrical disconnection between a terminal of a rotary machine and a voltage application unit for applying a plurality of different voltage levels (for example, the positive level of the positive electrode of the battery 12 and the ground level of the negative electrode of the battery 12) to the terminal of the rotary machine through the power converter, the inverter IV is used. However, the present invention is not limited to the structure.

Specifically, a power converter having a switching element that selectively establishes electrical connection and electrical disconnection between a terminal of a rotary machine and a voltage application unit for applying three or more different voltage levels to the terminal of the rotary machine through the power converter can be used as the power converter according to the present invention. For example, such a power converter for applying, therethrough, three or more different voltage levels to the terminal of a rotary machine is disclosed in the U.S. Pat. No. 7,256,561.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. An apparatus for driving a plurality of switching elements of a power converter so that each of the plurality of switching elements selectively establishes electrical connection and electrical disconnection between a terminal of a rotary machine and a voltage application unit for applying a plurality of different voltage levels to the terminal of the rotary machine through the power converter to thereby control a controlled variable of the rotary machine, the apparatus comprising:

a predicting unit configured to predict, based on a target value of a drive mode of the power converter at a next timing, a first value of the controlled variable, the drive mode being indicative of a switching-state of each of the plurality of switching elements, the target value of the drive mode of the power converter at the next timing being temporarily set at a present timing prior to the next timing; and a driving unit configured to:
drive the plurality of switching elements of the power converter based on the target value of the drive mode of the power converter at the next timing while limiting a number of switching-state changes in the plurality of switching elements from the present timing to the next timing as long as the deviation between the predicted first value of the controlled variable and a command value therefor is within a threshold range.

2. The apparatus according to claim 1, wherein the driving unit is configured to determine a present value of the drive mode of the power converter at the present timing as the target value of the drive mode thereof when the deviation between the predicted first value of the controlled variable and the command value therefor is within the threshold range.

3. The apparatus according to claim 2, wherein the predicting unit comprises:
a first predictor configured to temporarily set the preset value of the drive mode of the power converter at the present timing as the target value of the drive mode thereof at the next timing to thereby predict the first value of the controlled variable; and
a second predictor configured to temporarily set, as long as the deviation between the predicted first value of the controlled variable at the further next timing by the first predictor and the command value therefor is out of the threshold range, an alternative value as the target value of the drive mode of the power converter with the alternative value being different from the present value of the drive mode thereof at the present timing to thereby predict a new second value of the controlled variable as the first value of the controlled variable.

4. The apparatus according to claim 1, wherein the driving unit is configured to variably set the threshold range according to at least one of an angular velocity of the rotary machine, a torque to be generated in the rotary machine, a current flowing in the rotary machine, and a temperature of the rotary machine.

5. The apparatus according to claim 1, wherein the voltage application unit includes a direct power source with a positive electrode and a negative electrode, each of the plurality of switching elements of the power converter selectively connects one of the positive electrode and the negative electrode with the terminal of the rotary machine to thereby selectively apply one of the plurality of different voltage levels to the terminal of the rotary machine.

6. The apparatus according to claim 5, wherein the driving unit is configured to variably set the threshold range according to a modulation factor of an output voltage of the power converter.

7. The apparatus according to claim 1, wherein the driving unit is configured to control the threshold range such that a harmonic component of a current flowing in the rotary machine with a frequency higher than a fundamental frequency of the rotary machine is within a preset current level, the fundamental frequency being an inverse of an angular velocity of the rotary machine.

8. The apparatus according to claim 1, further comprising an initial value predicting unit configured to predict, based on any one of the first value and an alternative value of the drive mode of the power converter already determined as the drive mode at the next timing, an initial value to be used by the predicting of the first value of the controlled variable by the predicting unit.

9. The apparatus according to claim 8, wherein the initial value predicting unit is configured to predict, based on one of a measured value of the controlled variable and a measured value of a physical variable expressed as a function of the controlled variable, one of a value of the controlled variable and a corresponding value of the physical variable at the next timing as the initial value.

10. The apparatus according to claim 9, wherein the driving unit is configured to cyclically update the drive mode, the next timing corresponding to a next update timing, the driving unit being configured to predict, using, as the initial value, the value predicted by the initial value predicting unit, the first value of the controlled variable at a further next update timing one cycle after the next update timing.

11. The apparatus according to claim 10, the initial value predicting unit is configured to predict, based on: a value of the drive mode of the power converter used at a present update timing one cycle before the next updating timing, and one of the measured value of the controlled variable and the measured value of the physical variable measured synchronously with the present update timing, one of a value of the controlled variable and a corresponding value of the physical variable at the next update timing, the predicted one of the value of the controlled variable and the corresponding value of the physical variable being used as the initial value.

12. The apparatus according to claim 1, wherein the controlled variable is at least one of: a current flowing in the rotary machine, a torque to be generated in the rotary machine, and a magnetic flux to be generated in the rotary machine.

13. An apparatus for driving a plurality of switching elements of a power converter so that each of the plurality of switching elements selectively establishes electrical connection and electrical disconnection between a terminal of a rotary machine and a voltage application unit for applying a plurality of different voltage levels to the terminal of the rotary machine through the power converter to thereby control a controlled variable of the rotary machine, the apparatus comprising:
a first predicting unit configured to predict, based on a target value of a drive mode of the power converter at a next timing, a first value of the controlled variable, the drive mode being indicative of a switching-state of each of the plurality of switching elements, the target value of the drive mode of the power converter at the next timing being temporarily set to be equal to a present value of the drive mode determined at a present timing prior to the next timing; and
a determining unit configured to determine whether to use the target value of the drive mode of the power converter to thereby drive the plurality of switching elements of the power converter based on whether the deviation between the predicted first value of the controlled variable and a command value therefor is within a threshold range.

14. The apparatus according to claim 13, wherein the determining unit is configured determine to use the target value of the drive mode of the power converter when the deviation between the predicted first value of the controlled variable and the command value therefor is within the threshold range.

15. The apparatus according to claim 13, wherein the determining unit is configured to determine not to use the target value of the drive mode of the power converter when the deviation between the predicted first value of the controlled variable and the command value therefor is out of the threshold range, further comprising:
a second predicting unit configured to predict, for each of the plurality of driving modes except for the target value thereof, a second value of the controlled variable; and
a selecting unit configured to evaluate a value of an evaluation function for each of the plurality of driving modes based on the first predicted value and the second predicted values for the plurality of driving modes, and select one of the plurality of driving modes as the driving mode at the next timing.

* * * * *